United States Patent
Watanabe et al.

(10) Patent No.: US 9,176,798 B2
(45) Date of Patent: Nov. 3, 2015

(54) COMPUTER-READABLE RECORDING MEDIUM, FAILURE PREDICTION DEVICE AND APPLICABILITY DETERMINATION METHOD

(71) Applicant: FUJITSU LIMITED, Kawasaki-shi, Kanagawa (JP)

(72) Inventors: Yukihiro Watanabe, Kawasaki (JP); Hiroshi Otsuka, Kawasaki (JP); Yasuhide Matsumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 143 days.

(21) Appl. No.: 14/011,824

(22) Filed: Aug. 28, 2013

(65) Prior Publication Data

US 2014/0143625 A1     May 22, 2014

(30) Foreign Application Priority Data

Nov. 19, 2012   (JP) .................................. 2012-253731

(51) Int. Cl.
*G06F 11/00* (2006.01)

(52) U.S. Cl.
CPC .................................... *G06F 11/008* (2013.01)

(58) Field of Classification Search
USPC .................. 714/47.3, 47.1, 47.2, 48, 38.1, 39
See application file for complete search history.

(56) References Cited

U.S. PATENT DOCUMENTS

| | | | |
|---|---|---|---|
| 7,539,907 B1 * | 5/2009 | Johnsen et al. | 714/47.2 |
| 7,747,422 B1 * | 6/2010 | Sisley | 703/13 |
| 8,407,430 B2 * | 3/2013 | Hayamatsu | 711/156 |
| 8,448,025 B2 * | 5/2013 | Nakadai | 714/26 |
| 2005/0102121 A1 * | 5/2005 | Odhner et al. | 703/1 |
| 2007/0220149 A1 * | 9/2007 | Kawashima et al. | 709/226 |
| 2008/0092143 A1 * | 4/2008 | Koseki et al. | 718/105 |
| 2008/0104356 A1 * | 5/2008 | Nagai et al. | 711/170 |
| 2011/0066890 A1 * | 3/2011 | Bassin et al. | 714/37 |
| 2012/0151282 A1 * | 6/2012 | Watanabe et al. | 714/49 |
| 2014/0249777 A1 * | 9/2014 | Tanaka | 702/183 |

FOREIGN PATENT DOCUMENTS

| | | |
|---|---|---|
| GB | 2473970 A | 3/2011 |
| JP | 2009-176203 | 8/2009 |
| JP | 2012-3713 | 1/2012 |

OTHER PUBLICATIONS

Great Britain Search Report dated Jan. 30, 2014 for corresponding Great Britain Application No. 1315890.2.

* cited by examiner

*Primary Examiner* — Kamini Patel
(74) *Attorney, Agent, or Firm* — Fujitsu Patent Center

(57) ABSTRACT

A failure prediction device generates a failure predictor pattern in accordance with previous cases of failure that has occurred in a first system, the failure predictor pattern being used to detect a predictor of failure in the first system configuration. When a system configuration is changed from the first system configuration to a second system configuration, the failure prediction device calculates the difference information that indicates the difference between the system configurations by using the number of changes that is the accumulated number of times that a change of the configuration item which is included in a system is executed. The failure prediction device determines, in accordance with the calculated difference information, whether the failure predictor pattern is applicable to the detection of a predictor of failure in the second system configuration.

7 Claims, 20 Drawing Sheets

FIG.3

```xml
<cmdb>
<CIs>
<CI id="0SOIW3SH" item="Pc" type="PC1"/>
<CI id="SS9IHKER" item="Pc" type="PC2"/>
<CI id="H38FHZ0S" item="Os" type="OS(A)" ip="192.168.1.10"/>
<CI id="93H6SK8A" item="Os" type="OS(B)" ip="192.168.1.11"/>
<CI id="2H9JIIHY" item="App" type="AP1"/>
<CI id="029KKZHE" item="App" type="AP2"/>
<CI id="HREIO928" item="Instance" type="table_a"/>
<CI id="5T98IKSH" item="Instance" type="servlet_a"/>
</CIs>
<Relations>
<Relation id="02JOIUJM" src="0SOIW3SH" dst="H38FHZ0S" type="Has"/>
<Relation id="JREHA98H" src="H38FHZ0S" dst="0SOIW3SH" type="InstalledOn"/>
<Relation id="GK92EOKA" src="SS9IHKER" dst="93H6SK8A" type="Has"/>
<Relation id="HKE928UH" src="93H6SK8A" dst="SS9IHKER" type="InstalledOn"/>
<Relation id="JY9W84II" src="H38FHZ0S" dst="93H6SK8A" type="ConnectedTo"/>
<Relation id="IEJBGB0" src="H38FHZ0S" dst="029KKZHE" type="Has"/>
<Relation id="49AO2KAW" src="029KKZHE" dst="H38FHZ0S" type="InstalledOn"/>
<Relation id="Q09R5IKS" src="93H6SK8A" dst="2H9JIIHY" type="Has"/>
<Relation id="0367DHRJ" src="2H9JIIHY" dst="93H6SK8A" type="InstalledOn"/>
<Relation id="23KD99EU" src="029KKZHE" dst="HREIO928" type="Has"/>
<Relation id="87EUDHWE" src="HREIO928" dst="029KKZHE" type="DeployedOn"/>
<Relation id="MJUYEGCX" src="2H9JIIHY" dst="5T98IKSH" type="Has"/>
<Relation id="2YDBI98A" src="5T98IKSH" dst="2H9JIIHY" type="DeployedOn"/>
<Relation id="YIRUETWG" src="5T98IKSH" dst="HREIO928" type="Use"/>
</Relations>
</cmdb>
```

| TIME | CHANGE TYPE | TARGET | PARAMETER |
|---|---|---|---|
| 2012-03-13T10:31:02-09:00 | DEL | 2H9JIIHY | |
| 2012-03-13T10:35:28-09:00 | ADD | 22OGEANA | |
| 2012-03-25T21:00:18-09:00 | MOD | 93H6SK8A | TARGET=OS_VERSION VALUE=SP3 |
| ⋮ | ⋮ | ⋮ | ⋮ |

FIG.6

```
Aug 11 12:23:10|192.168.1.11|avahi-daemon[4764]:<0628>:Registering HINFO record with values 'X86_64'/'LINUX'.
Aug 11 12:23:11|192.168.1.10|smartd[4821]:<0500>:smartd version 5.38 [x86_64-redhat-linux-gnu] Copyright (C) 2002-8 Bruce Allen
Aug 11 12:23:11|192.168.1.10|smartd[4821]:<0501>:Home page is http://smartmontools.sourceforge.net/
Aug 11 12:23:11|192.168.1.10|smartd[4821]:<0502>:Opened configuration file /etc/smartd.conf
Aug 11 12:23:11|192.168.1.10|smartd[4821]:<0503>:Configuration file /etc/smartd.conf was parsed, found DEVICESCAN, scanning devices
Aug 11 12:23:11|192.168.1.10|smartd[4821]:<0590>:Problem creating device name scan list
Aug 11 12:23:11|192.168.1.10|smartd[4821]:<0591>:Device: /dev/sda, opened
Aug 11 12:23:11|192.168.1.10|smartd[4821]:<0592>:Device: /dev/sda, is SMART capable. Adding to "monitor" list.
Aug 11 12:23:11|192.168.1.10|smartd[4821]:<0591>:Device: /dev/sdb, opened
Aug 11 12:23:11|192.168.1.10|smartd[4821]:<0592>:Device: /dev/sdb, is SMART capable. Adding to "monitor" list.
Aug 11 12:23:11|192.168.1.10|smartd[4821]:<0520>:Monitoring 0 ATA and 2 SCSI devices
Aug 11 13:23:11|192.168.1.11|kernel:<9110>:Bridge firewalling registered
Aug 11 12:23:13|192.168.1.11|pcscd:<2580>:winscard.c:304:SCardConnect() Reader E-Gate 0 0 Not Found
Aug 11 12:27:28|192.168.1.10|ntpd[4642]:<1630>:synchronized to 10.25.192.105, stratum 4
```

```
<?xml version="1.0" encoding="UTF-8" standalone="no"?>
<Failures>
  <Failure uid="2012031300001" type="T001" date="2012-03-13T10:51:02-09:00" title="Web Down" />
  <Failure uid="2012031300002" type="T002" date="2012-03-16T20:16:51-09:00" title="HDD Fault" />
  <Failure uid="2012031800001" type="T003" date="2012-03-18T03:25:22-09:00" title="DB Slow Down" />
  <Failure uid="2012031800002" type="T004" date="2012-03-18T03:26:00-09:00" title="Web Slow Down" />

<Failure uid="2012041200025" type="T001" date="2012-04-12T16:31:08-09:00" title="Web Down" />
  <Failure uid="2012041200026" type="T002" date="2012-04-12T22:51:37-09:00" title="HDD Fault" />
</Failures>
```

| FAILURE | MESSAGE PATTERN | TOTAL NUMBER OF OCCUR-RENCES | NUMBER OF OCCUR-RENCES BEFORE FAILURE | CO-OCCUR-RENCE PROB-ABILITY |
|---|---|---|---|---|
| T001 | [0005, 0007, 0012] | 572 | 534 | 0.93 |
| T001 | [0005, 0012, 0036] | 270 | 242 | 0.90 |
| T001 | [0008, 0036, 0041, 0108] | 72 | 62 | 0.86 |
| T002 | [0005, 0007, 0012] | 572 | 501 | 0.88 |
| T002 | [0003, 0011, 0014, 0028] | 43 | 35 | 0.81 |

17b

| PATTERN | [0005, 0007, 0012] | |
|---|---|---|
| LEARNING TIME | 2012-03-08T10:20:00-09:00 | |
| TIME | MESSAGE TYPE ID | MESSAGE SENDING CI |
| 2012-03-08T10:20:00-09:00 | 0012 | 0SOIW3SH |
| 2012-03-08T10:18:52-09:00 | 0007 | 2H9JIIHY |
| 2012-03-08T10:18:40-09:00 | 0007 | 029KKZHE |
| 2012-03-08T10:16:33-09:00 | 0007 | 2H9JIIHY |
| 2012-03-08T10:16:31-09:00 | 0005 | 029KKZHE |
| ... | ... | ... |

FIG.9

| TIME | FAILURE TYPE | DETECTION PATTERN | DETECTION CONFIGURATION | CO-OCCURRENCE PROBABILITY | CONFIGURATION CHANGE AMOUNT (NUMBER OF CHANGES, NUMBER OF DIFFERENCES) |
|---|---|---|---|---|---|
| 2012-04-12T16:16:00-09:00 | T001 | [0005, 0007, 0012] | 0SOIW3SH 029KKZHE 22OGEANA | 0.93 | (10, 2) |
| 2012-04-12T16:16:00-09:00 | T002 | [0005, 0007, 0012] | ... | 0.88 | ... |
| 2012-04-12T16:38:40-09:00 | T001 | [0008, 0036, 0041, 0108] | ... | 0.86 | ... |
| 2012-04-12T16:49:28-09:00 | T003 | [0027, 0066, 0091, 0101] | ... | 0.88 | ... |
| 2012-04-12T16:50:32-09:00 | T001 | [0005, 0012, 0036] | ... | 0.90 | ... |

FIG.13

| PATTERN | [0005, 0007, 0012] | |
|---|---|---|
| DETECTION TIME | 2012-04-12T16:16:00-09:00 | |
| TIME | MESSAGE TYPE ID | MESSAGE SENDING CI |
| 2012-04-12T16:16:00-09:00 | 0012 | 0SOIW3SH |
| 2012-04-12T16:15:40-09:00 | 0007 | 029KKZHE |
| 2012-04-12T16:14:38-09:00 | 0007 | 22OGEANA |
| 2012-04-12T16:14:31-09:00 | 0005 | 029KKZHE |
| ⋮ | ⋮ | ⋮ | ically pointed out in the claims.
COMPUTER-READABLE RECORDING MEDIUM, FAILURE PREDICTION DEVICE AND APPLICABILITY DETERMINATION METHOD

CROSS-REFERENCE TO RELATED APPLICATION

This application is based upon and claims the benefit of priority of the prior Japanese Patent Application No. 2012-253731 filed on Nov. 19, 2012, the entire contents of which are incorporated herein by reference.

FIELD

The embodiments discussed herein are related to an applicability determination program, a failure prediction device, and an applicability determination method.

BACKGROUND

As a way of predicting failure that occurs in an information processing system, failure prediction devices that use a failure predictor pattern indicating a predictor of failure have been known. For example, the failure prediction device extracts, on the basis of the previous logs and failure occurrence information, a combination of messages that have a high co-occurrence probability with which failure occurs. When the same combination of messages as that of the failure predictor pattern is output from the information processing system, the failure prediction device determines that there is a possibility that the failure occurs.

Furthermore, in a well-known technique, when the failure determination rule used for predicting failure is to be reused in a different system, or the like, the reference for determining whether the rule can be reused is set for each configuration item included in the information processing system. For example, if the number of monitor items in the operating system (OS) equal to or greater than the threshold is identical or the version of the OS is identical, it is determined that the failure determination rule is to be reused.

Japanese Laid-open Patent Publication No. 2009-176203
Japanese Laid-open Patent Publication No. 2012-3713

However, the above-described technology has a problem in that, as the failure predictor pattern is generated on the basis of the co-occurrence probability, it is not certain how much effect the changes in the system configuration would have on the pattern, and it is difficult to determine whether the application of the failure predictor pattern is appropriate or not.

For example, in a cloud system, the large number of configuration items is included in the system, and the system configuration is frequently changed. Therefore, if a failure predictor pattern is learned each time the system configuration is changed, the learning time becomes short and the reliability of the generated failure predictor pattern is decreased.

If the technique for setting the reference for each configuration item is applied to the failure predictor pattern, the reference is generated for each configuration item and the failure predictor pattern is changed in accordance with the reference each time the system configuration is changed. Thus, as this technique increases the workload, it is not suitable for the cloud systems.

Thus, according to the above-described technologies, it is difficult to determine whether the failure predictor pattern that is to be applied to a specific information processing system is a valid pattern or not; therefore, the invalid failure predictor pattern is applied, and a predictor of failure can be missed.

SUMMARY

According to an aspect of the embodiment, a computer-readable recording medium storing therein an applicability determination program that causes a computer to execute a process. The process includes generating a failure predictor pattern in accordance with previous cases of failure that has occurred in a first system configuration, the failure predictor pattern being used to detect a predictor of failure in the first system configuration; when a system configuration is changed from the first system configuration to a second system configuration, calculating difference information that indicates a difference between the system configurations by using a number of changes that is an accumulated number of times that a change of the configuration item which is included in a system is executed; and determining, in accordance with the calculated difference information, whether the failure predictor pattern is applicable to detection of a predictor of failure in the second system configuration.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram that illustrates an example of information stored in a configuration information DB;

FIG. 6 is a diagram that illustrates an example of information stored in a management message DB;

FIG. 7 is a diagram that illustrates an example of information stored in a failure information DB;

FIG. 8 is a diagram that illustrates an example of information stored in a failure predictor pattern DB;

FIG. 9 is a table that illustrates an example of information stored in a failure predictor register DB;

FIG. 13 is a diagram that illustrates an example of the configuration information obtained when a predictor of failure is detected;

DESCRIPTION OF EMBODIMENTS

Preferred embodiments will be explained with reference to accompanying drawings. The present invention is not limited to this embodiment.

[a] First Embodiment

Overall Configuration

Figure 1:
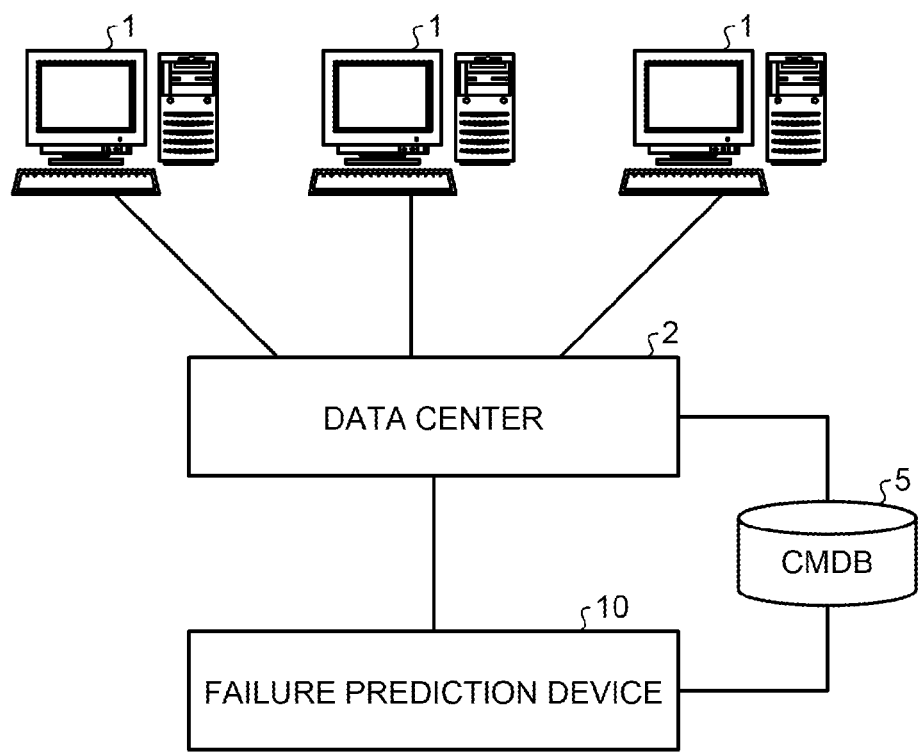
FIG. 1 is a diagram that illustrates an example of the overall configuration of a system according to a first embodiment.

FIG. 1 is a diagram that illustrates an example of the overall configuration of a system according to a first embodiment. As illustrated in FIG. 1, this system includes a plurality of client terminals 1, a data center 2, a configuration management database (CMDB) 5, and a failure prediction device 10, and it uses a cloud system to provide services to the client terminals 1.

Each of the client terminals 1 is a terminal that accesses the data center 2 and uses the cloud system in order to receive services provided thereby. In the data center 2, a plurality of physical servers is installed, a plurality of virtual machines is in operation, and an information processing system is configured by the virtual machines for each client. Each information processing system is generated from the same template so as to provide services to each client.

The CMDB 5 is a database that performs integrated management on the configurations of the information processing systems provided by the data center 2. The CMDB 5 manages, in an associated manner, a configuration item (CI) included in each information processing system, the attributes of each configuration item, the relationship between each configuration item and a configuration item in another information processing system, and the like.

The failure prediction device 10 is a server that, by using the CMDB 5, detects a predictor of failure that occurs in the information processing system provided by the data center 2. With the above condition, the failure prediction device 10 generates a failure predictor pattern in accordance with previous cases of failure that have occurred in a first system configuration, the failure predictor pattern being used to detect a predictor of failure in the first system configuration. When the system configuration is changed from the first system configuration to a second system configuration, the failure prediction device 10 calculates difference information that indicates the difference between the system configurations by using the number of changes, which is the accumulated number of times a change is made to the configuration items included in the system. Afterward, the failure prediction device 10 determines, in accordance with the calculated difference information, whether the failure predictor pattern is applicable to the detection of a predictor of failure in the second system configuration.

Thus, the failure prediction device 10 quantifies the degree of difference between the system configuration obtained when the failure predictor pattern is learned and the system configuration to which the pattern is to be applied, and determines whether the pattern is applicable to the system that is different from the one obtained when the pattern is learned, thereby determining the validity of the failure predictor pattern.

Configuration of Failure Prediction Device

Figure 2:
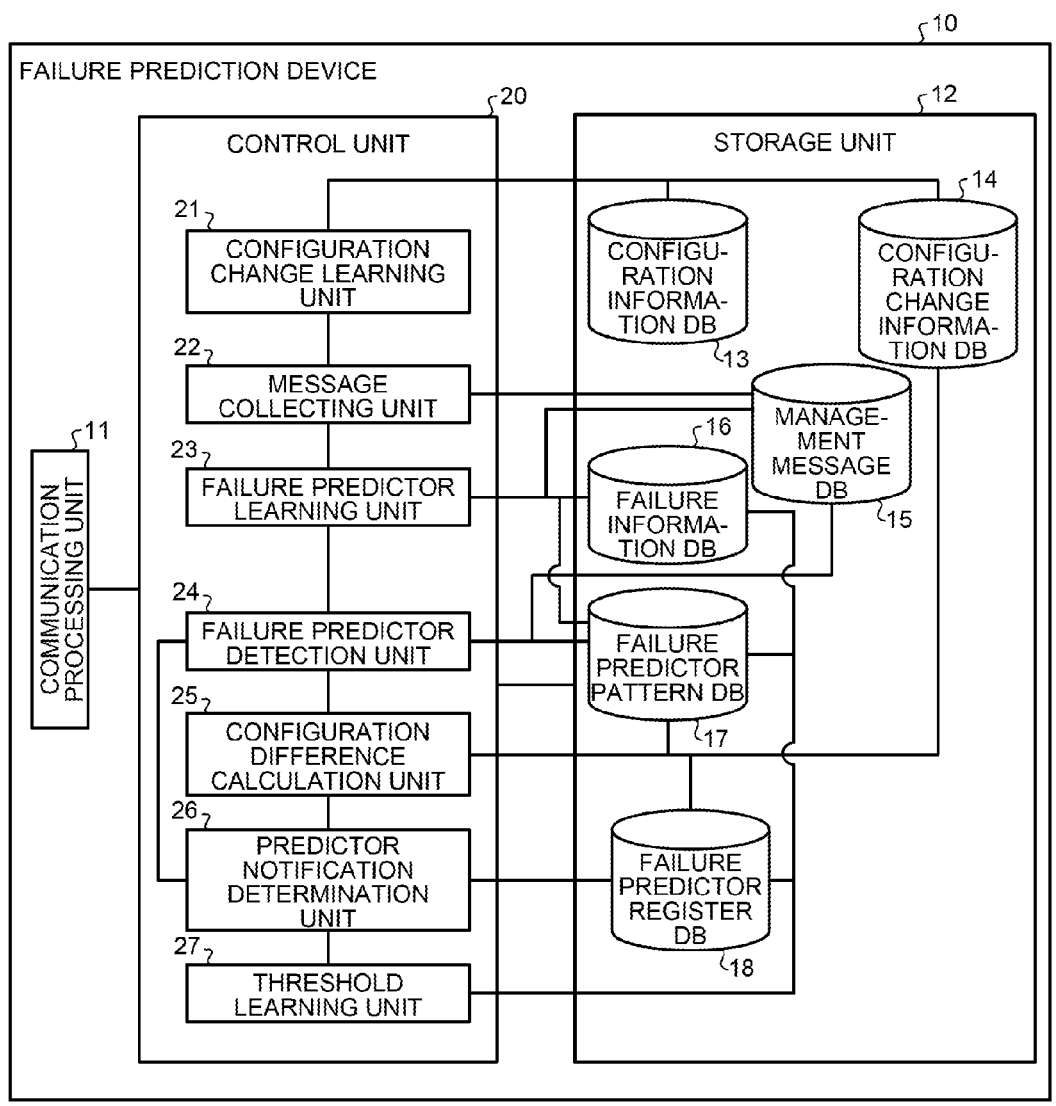
FIG. 2 is a functional block diagram that illustrates the functional configuration of a failure prediction device according to the first embodiment.

FIG. 2 is a functional block diagram that illustrates the functional configuration of the failure prediction device according to the first embodiment. The client terminal 1 illustrated in FIG. 1 has the same functional configuration as that of a typical computer; therefore, a detailed explanation thereof is omitted. Similarly, the physical server included in the data center 2 has the same functional configuration as that of a typical server; therefore, a detailed explanation thereof is omitted.

As illustrated in FIG. 2, the failure prediction device 10 includes a communication processing unit 11, a storage unit 12, and a control unit 20. Here, the communication processing unit 11 is a network interface card, or the like, the storage unit 12 is a storage device, such as a memory, and the control unit 20 is a processor, such as a central processing unit (CPU).

The communication processing unit 11 is a processing unit that controls communication with another device. For example, the communication processing unit 11 receives log messages from the data center 2. Moreover, the communication processing unit 11 notifies an undepicted management device of the occurrence of failure or of a predictor of failure. Furthermore, the communication processing unit 11 receives, from the management device and the like, the change of a configuration item that constitutes the information processing system in the data center 2, information on occurring failure, and the like.

The storage unit 12 stores therein a configuration information DB 13, a configuration change information DB 14, a management message DB 15, a failure information DB 16, a failure predictor pattern DB 17, and a failure predictor register DB 18.

The configuration information DB 13 stores therein configuration information on the information processing system in the data center 2. Specifically, the configuration information DB 13 stores therein, for each information processing system, the configuration items included in the information processing system and the relationship between the configuration items. The configuration information DB 13 may be the CMDB 5 itself, or it may be a storage unit that stores therein data acquired from the CMDB 5. FIG. 3 is a diagram that illustrates an example of information stored in the configuration information DB. FIG. 3 illustrates, for example, a case where the configuration information is managed by using the Extensible Markup Language (XML) format; however, this is not a limitation and other formats may be used.

As illustrated in FIG. 3, the configuration information DB 13 stores therein "CIs" that manage information on configuration items and "Relations" that indicate the relationship between configuration items. The information set herein is changed by an administrator or the like. The "CIs" define and manage the configuration items by using records that contain "CI id", "item", "type", "ip", or the like. The identifier for identifying a configuration item is set to the "CI id". The function of a configuration item in the information processing system is set to the "item". The name of a configuration item, or the like, is set to the "type". The address assigned to a configuration item is set to the "ip".

For example, the first line of the "CIs" in FIG. 3 defines that the configuration item "type=PC1" operates as "Pc" in the information processing system and is identified as "CI id=0SOIW3SH". Similarly, the third line of the "CIs" in FIG. 3 defines that the configuration item "type=OS(A)" operates as "Os" in the information processing system and is identified as "CI id=H38FHZ0S" and "ip=192.168.1.10" is set. Furthermore, the fifth line of the "CIs" in FIG. 3 defines that the configuration item "type=AP1" operates as "APP", i.e., an application in the information processing system and is identified as "CI id=2H9JIIHY". Moreover, the seventh line of the "CIs" in FIG. 3 defines that the configuration item "type=table_a" operates as "Instance", i.e., a storage unit in the information processing system and is identified as "CI id=HREI0928".

Furthermore, "Relations" define the relationship between configuration items by using records that contain "Relations id", "src", "dst", "type", or the like. The identifier for identifying the relationship is set to the "Relations id". The identifier for a configuration item that is the relation source is set to the "src", and the identifier for a configuration item that is the relation destination is set to the "dst". Information for identifying the relationship is set to the "type".

The first line of the "Relations" in FIG. 3 defines that "PC1" that is "CI id=0SOIW3SH" on the "src" side holds "OS(A)" that is "CI id=H38FHZ0S" on the "dst" side. "Has" that is set to the "type" indicates the relation where the relation source holds the relation destination, i.e., the relation where the relation destination is operating at the relation source. Furthermore, "InstalledOn" indicates the relation where the relation destination is installed in the relation source. "ConnectedTo" indicates the relation where the relation source and the relation destination are connected to each other. "Use" indicates the relation where the relation source uses or refers to the relation destination. "DeployedOn" indicates the relation where the relation source makes the relation destination usable, i.e., the relation where the relation destination is used by using the relation source.

Figures 4, 5:
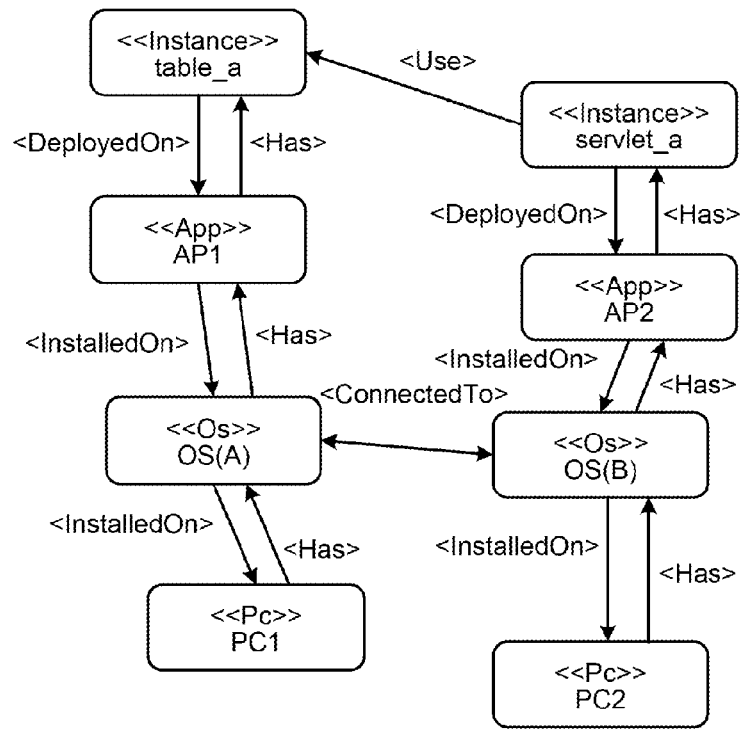
FIG. 4 is a diagram that illustrates the relationship between the configuration items.
FIG. 5 is a table that illustrates an example of information stored in a configuration change information DB.

Here, FIG. 4 illustrates the relationship between the configuration items that are explained with reference to FIG. 3. FIG. 4 is a diagram that illustrates the relationship between the configuration items. In FIG. 4, the squares indicate configuration items, and the arrows indicate relationships. As illustrated in FIG. 4, the configuration item "PC1" holds the configuration item "OS(A)", the configuration item "OS(A)" holds the configuration item "AP1", and the configuration item "AP1" holds the configuration item "table_a". Furthermore, the configuration item "table_a" is controlled such that it can be used in the configuration item "AP1", the configuration item "AP1" is installed in the configuration item "OS (A)", and the configuration item "OS(A)" is installed in the configuration item "PC1".

Similarly, the configuration item "PC2" holds the configuration item "OS(B)", the configuration item "OS(B)" holds the configuration item "AP2", and the configuration item "AP2" holds the configuration item "servlet_a". Furthermore, the configuration item "servlet_a" is controlled such that it can be used in the configuration item "AP2", the configuration item "AP2" is installed in the configuration item "OS(B) ", and the configuration item "OS(B)" is installed in the configuration item "PC2". Moreover, the configuration item "OS(A)" and the configuration item "OS(B)" are connected to each other, and the configuration item "servlet_a" refers to the configuration item "table_a".

All the configuration items illustrated in FIG. 4 operate as a single information processing system and, as a tenant, provide services to clients. Furthermore, the "PC1", "OS(A)", "AP1", and "table_a" may be tenant 1 to provide services to clients, and the "PC2", "OS(B)", "AP2", and "servlet_a" may be tenant 2 to provide services to clients.

Reference is made back to FIG. 2. The configuration change information DB 14 stores therein changes in the configuration of the information processing system. The information stored therein may be updated by a configuration change learning unit 21, which will be described later, or by an administrator, or the like. FIG. 5 is a table that illustrates an example of information stored in the configuration change information DB.

As illustrated in FIG. 5, the configuration change information DB 14 stores therein "time, change type, target, parameter". The "time" indicates the time and date that a change is made to the configuration. The "change type" indicates the details of the change. "DEL" is set in the case of deletion, "ADD" is set in the case of addition, and "MOD" is set in the case of modification of settings. The "target" indicates the changed configuration item. The "parameter" indicates the changed parameter. As well as the above information, the configuration change information DB 14 may store therein, for example, information for identifying an information processing system or tenant to which a change is made.

In the case of FIG. 5, it indicates that the configuration item "2H9JIIHY" was deleted from the information processing system on "Japan Standard Time, Mar. 13, 2012, 10:31:02". Furthermore, it indicates that the configuration item "22OGEANA" was added to the information processing system on "Japan Standard Time, Mar. 13, 2012, 10:35:28". Moreover, it indicates that "OS VERSION" was changed to "SP3" in the settings of the configuration item "93H6SK8A" on "Japan Standard Time, Mar. 25, 2012, 21:00:18".

The management message DB 15 stores therein log messages output from each configuration item, or the like, in the information processing system. The information stored therein may be updated by a message collecting unit 22, which will be described later, or an administrator, or the like. FIG. 6 is a diagram that illustrates an example of information stored in the management message DB.

As illustrated in FIG. 6, the management message DB 15 stores therein messages, each message being made up of fields 15a to 15e. The time and date that a log message is output is output to the time field 15a. The name of the host of the configuration item that outputs a log message is output to the host name field 15b. The name of the module that outputs a log message is output to the module name field 15c. The message ID for identifying the type of log message is output to the message type field 15d. The detailed contents of the output log message are output to the message field 15e.

Configuration information can be specified by using the host name field 15b and the module name field 15c. Specifically, the host name field 15b in FIG. 6 corresponds to the "item" in FIG. 3, and the module name field 15c in FIG. 6 corresponds to the "type" in FIG. 3.

The failure information DB 16 stores therein information on the failures that have occurred. The information stored therein may be updated by an administrator, or the like, or may be acquired from the administrator's terminal and updated by the control unit 20. FIG. 7 is a diagram that illustrates an example of information stored in the failure information DB. FIG. 7 illustrates, as an example, a case where the failure information is managed by using the XML format; however, this is not a limitation and other formats may be used.

As illustrated in FIG. 7, the failure information DB 16 stores therein failure information with the record that contains "Failure uid", "type", "date", "title", or the like. The "Failure uid" is an identifier for identifying failure information. The "type" is information for identifying the type of failure. The "date" is the time and date that the failure occurs. The "title" is the details of the failure.

An explanation is given with reference to, for example, FIG. 7. It indicates that "T001" indicating the failure "Web Down" occurred on "Japan Standard Time, Mar. 13, 2012, 10:51:02" and this failure is identified as "201203130001". It also indicates that "T001" indicating the failure "Web Down" occurred on "Japan Standard Time, Apr. 12, 2012, 16:31:08" and this failure is identified as "201204120025". It also indicates that "T003" indicating the failure "DB Slow Down" occurred on "Japan Standard Time, Mar. 18, 2012, 03:25:22" and this failure is identified as "201203180001".

The failure predictor pattern DB 17 stores therein, in an associated manner, a failure predictor pattern that is a pattern of log messages for specifying a predictor of failure and configuration information that is obtained when the pattern is generated. The information stored therein is updated by a failure predictor learning unit 23, which will be described later. FIG. 8 is a diagram that illustrates an example of information stored in the failure predictor pattern DB. As illustrated in FIG. 8, the failure predictor pattern DB 17 stores therein, in an associated manner, a failure predictor pattern 17a and The learning-time configuration information 17b obtained at the time of learning.

The failure predictor pattern 17a is made up of "failure, message pattern, total number of occurrences, number of occurrences before failure, co-occurrence probability". The "failure" is information for identifying the type of failure and corresponds to the "type" illustrated in FIG. 7. The "message pattern" is a combination of messages that are generated before the actual failure is detected and is a combination of identifiers that are output to the message type field 15d illustrated in FIG. 6. The "total number of occurrences" is the number of times that the message pattern is generated. The "number of occurrences before failure" is the number of times that the actual failure is detected after the message pattern is generated. The "co-occurrence probability" is the probability that the failure occurs when the message pattern is generated and is the value calculated as the number of occurrences before failure/the total number of occurrences.

In the case of FIG. 8, it indicates that the failure predictor pattern "0005, 0007, 0012" has been generated 572 times so far and, out of them, the failure "T001" has actually occurred 534 times, and the co-occurrence probability that the failure "T001" occurs when the pattern is generated is "0.93". Similarly, it indicates that the failure predictor pattern "0005, 0007, 0012" has been generated 572 times so far and, out of them, the failure "T002" has actually occurred 501 times, and the co-occurrence probability that the failure "T002" occurs when the pattern is generated is "0.88". Furthermore, it indicates that the failure predictor pattern "0008, 0036, 0041, 0108" has been generated 72 times so far and, out of them, the failure "T001" has actually occurred 62 times, and the co-occurrence probability that the failure "T001" occurs when the pattern is generated is "0.86".

The learning-time configuration information 17b is stored, for each failure predictor pattern, such that "learning time, configuration information (time, message type ID, message sending CI)" are related to each other. In the learning-time configuration information 17b illustrated in FIG. 8, the "pattern" corresponds to a failure predictor pattern, and the "learning time" is the time when the failure predictor pattern is learned. Furthermore, the "time" in the configuration information is the time when the message is sent. The "message type ID" is the identifier of the sent message and corresponds to the identifier that is output to the message type field 15d illustrated in FIG. 6. The "message sending CI" is the configuration item that sends the message and corresponds to the "CI id" illustrated in FIG. 3.

In the case of FIG. 8, the time and date that the failure predictor pattern "0005, 0007, 0012" was learned is "Japan Standard Time, Mar. 8, 2012, 10:20:00". It indicates that, at that time, the configuration item "029KKZHE" output the message "0005", the configuration item "029KKZHE" and the configuration item "2H9JIIHY" output the message "0007", and the configuration item "0SOIW3SH" output the message "0012".

The failure predictor register DB 18 stores therein detected predictors of failure. The information stored therein is updated by a predictor notification determination unit 26, or the like. FIG. 9 is a table that illustrates an example of information stored in the failure predictor register DB. As illustrated in FIG. 9, the failure predictor register DB 18 stores therein "time, failure type, detection pattern, detection configuration, co-occurrence probability, configuration change amount".

The "time" is the time when a predictor of failure is detected. The "failure type" is the identifier for identifying a failure whose predictor is detected and corresponds to the "failure" in FIG. 8. The "detection pattern" is a detected failure predictor pattern and corresponds to the "message pattern" in FIG. 8. The "detection configuration" is the configuration of the system obtained when a predictor of failure is detected and is a combination of configuration items "Ci id". The "co-occurrence probability" is the probability of co-occurrence of the detected failure predictor pattern and the failure in the "failure type" and corresponds to the "co-occurrence probability" in FIG. 8. The "configuration change amount" is information that indicates the degree of difference between the configuration information obtained when the detected failure predictor pattern is learned and the configuration information obtained when the failure predictor pattern is detected, and it is calculated by a configuration difference calculation unit 25, which will be described later.

In the case of FIG. 9, it indicates that the failure predictor pattern "0005, 0007, 0012" was detected on "Japan Standard Time, Apr. 12, 2012, 16:16:00", and the co-occurrence probability of the failure "T001" is "0.93". Furthermore, it indicates that the system configuration obtained when the failure predictor pattern "0005, 0007, 0012" was detected is "0SOIW3SH, 029KKZHE, 22OGEANA" and the configuration change amount between the configuration information obtained at this detection time and the configuration information obtained at the time of learning the failure predictor pattern is "10, 2".

With reference back to FIG. 2, the control unit 20 is a processing unit that includes the configuration change learning unit 21, the message collecting unit 22, the failure predictor learning unit 23, a failure predictor detection unit 24, the configuration difference calculation unit 25, the predictor notification determination unit 26, and a threshold learning unit 27 and, by using the above units, performs detection of a predictor of failure.

The configuration change learning unit 21 is a processing unit that detects changes in the system configuration of the information processing system, updates the configuration change information DB 14, and learns changes in the configuration information. Specifically, the configuration change learning unit 21 monitors the configuration information DB 13 and, when it detects an update to the configuration information DB 13, stores the contents of the update in the configuration change information DB 14.

For example, assume that the OS of "H38FHZ0S" in the tenant 1 was changed from "OS(A)" to "OS(C)" on "May 12, 2012, 11:00:00". In this case, the configuration change learning unit 21 stores, in the configuration change information DB 14, "time (2012-05-12711:00:00-09:00), change type (MOD), target (H38FHZ0S), parameter (TARGET=OS, VALUE=OS (C))".

The message collecting unit 22 is a processing unit that collects, from each information processing system in the data center 2, a log message that is output from the information processing system and then stores the collected message in the management message DB 15.

The failure predictor learning unit 23 is a processing unit that generates, on the basis of previous cases of failure that have occurred, a failure predictor pattern that is a pattern of log messages indicating a predictor of failure and performs learning at a predetermined interval. Specifically, the failure predictor learning unit 23 is a processing unit that regularly generates failure predictor patterns, extracts failure predictor patterns, learns the co-occurrence probability with respect to a failure predictor pattern, or the like, thereby updating the failure predictor pattern DB 17.

For example, the failure predictor learning unit 23 extracts, from the management message DB 15, log messages generated during a certain period of time in the past and generates a message pattern from the group of extracted log messages. Furthermore, the failure predictor learning unit 23 identifies the configuration items that output the messages included in each of the generated message patterns. The failure predictor learning unit 23 then increments the "total number of occurrences" if the generated message pattern combination is stored in the failure predictor pattern DB 17 and, if it is not stored, generates a new entry.

Afterward, if a failure occurs within a predetermined time after the message has been generated, the failure predictor learning unit 23 increments the "number of occurrences before failure" that corresponds to the combination of the identifier for identifying the failure and the message pattern and then updates the co-occurrence probability. Conversely, if any failure does not occur, the failure predictor learning unit 23 updates the co-occurrence probability without incrementing the "number of occurrences before failure" that corresponds to the combination of the identifier for identifying the failure and the message pattern.

Figure 10:
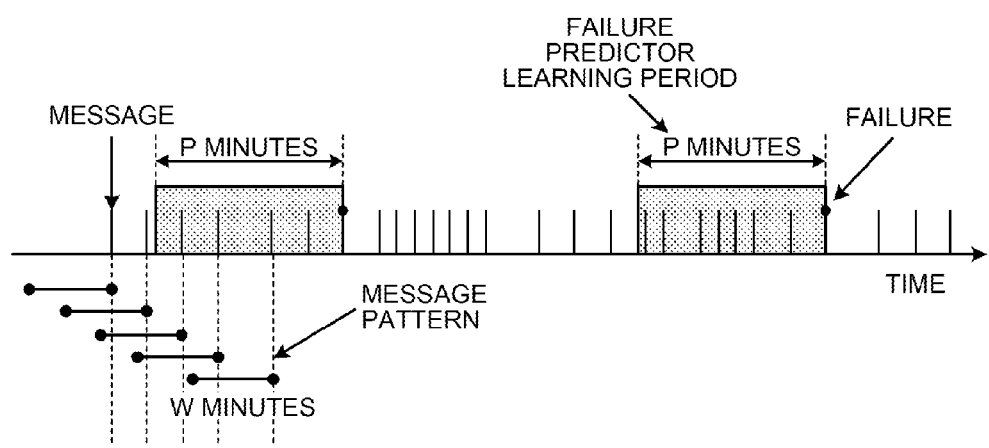
FIG. 10 is a diagram that illustrates the learning of a failure predictor pattern.

Here, a detailed explanation is given with reference to FIG. 10. FIG. 10 is a diagram that illustrates the learning of a failure predictor pattern. As illustrated in FIG. 10, when the optionally set learning time is reached, the failure predictor learning unit 23 extracts, from the management message DB 15, the messages that are output during the period of W minutes within the failure predictor learning period (P minutes). P minutes may be arbitrarily set and, when the time (S minutes) at which the failure occurs is used as a reference, P minutes may be set to continue until a predetermined time before S minutes. Next, assume that the failure predictor learning unit 23 refers to the message type field 15d of each of the messages and extracts the combination of "0005, 0007, 0012" during the period of W minutes.

The failure predictor learning unit 23 then refers to the failure predictor pattern DB 17 and increments the "number of occurrences" that corresponds to "0005, 0007, 0012" regardless of the "failure". In the example of FIG. 8, the failure predictor learning unit 23 increments the "number of occurrences" of each of "T001" and "T002" that correspond to "0005, 0007, 0012". Furthermore, with respect to each message of the extracted message pattern "0005, 0007, 0012", the failure predictor learning unit 23 identifies the "item" and "type" stored in the configuration information DB 13 by using the host name field 15b and the module name field 15c and then identifies the "CI id" that corresponds to the "item" and "type". The failure predictor learning unit 23 then associates the extracted message pattern "0005, 0007, 0012" with the identified "CI id" and stores it in the failure predictor pattern DB 17 as the learning-time configuration information 17b.

Afterward, the failure predictor learning unit 23 refers to the failure information DB 16 and, if the failure "T001" has occurred within the time period after W minutes and until P minutes, the failure predictor learning unit 23 increments the "number of occurrences before failure" that corresponds to the combination of "T001" and "0005, 0007, 0012". Furthermore, the failure predictor learning unit 23 refers to the failure information DB 16 and, if the failure "T002" has occurred within the time period after W minutes and until P minutes, the failure predictor learning unit 23 increments the "number of occurrences before failure" that corresponds to the combination of "T002" and "0005, 0007, 0012". The failure predictor learning unit 23 then uses the updated "total number of occurrences" and "number of occurrences before failure", which are currently stored, to calculate and update the co-occurrence probability.

Reference is made back to FIG. 2. The failure predictor detection unit 24 is a processing unit that detects a predictor of failure by using the failure predictor pattern stored in the failure predictor pattern DB 17. Specifically, the failure predictor detection unit 24 monitors a log message that is stored in the management message DB 15 as needed and detects a predictor of failure when it detects the occurrence of the same pattern as the failure predictor pattern stored in the failure predictor pattern DB 17. The failure predictor detection unit 24 then notifies the configuration difference calculation unit 25 and the predictor notification determination unit 26 of the detected predictor of failure and of the failure predictor pattern.

For example, when the failure predictor detection unit 24 detects the pattern "0005, 0007, 0012" in the management message DB 15, the failure predictor detection unit 24 detects predictors of the failures "T001" and "T002" and notifies them to the configuration difference calculation unit 25 and the predictor notification determination unit 26. At that time, the failure predictor detection unit 24 identifies the configuration item that output the message that matches the failure predictor pattern by using the same method as that used by the failure predictor learning unit 23 and then notifies it to the configuration difference calculation unit 25 and the predictor notification determination unit 26.

The configuration difference calculation unit 25 is a processing unit that calculates the difference distance indicating the difference between the system configurations by using multiple indices, the indices defining the difference in the configuration that exists between the system configuration obtained when the failure predictor pattern is learned and the system configuration obtained when a predictor of failure is detected.

For example, when the configuration is changed from the configuration information obtained when the failure predictor pattern is learned to the configuration information obtained when a predictor of failure is detected, the configuration difference calculation unit 25 calculates the number of changes that is the accumulated number of times a change is made to the configuration items. Furthermore, the configuration difference calculation unit 25 calculates the number of differences that is the number of different configuration items between the configuration items obtained when the failure predictor pattern is learned and the configuration items obtained when the predictor of failure is detected. The configuration difference calculation unit 25 then uses the number of changes and the number of differences to calculate the difference distance between the learning-time configuration information and the detection-time configuration information. The configuration difference calculation unit 25 stores the time when the applied failure predictor pattern is learned and identifies, from the failure predictor pattern DB 17, the learning-time configuration information that corresponds to the learning time. Thus, the configuration difference calculation unit 25 can accurately calculate the difference distance between the learning-time configuration information and the detection-time configuration information even though the latest failure predictor pattern has not been applied.

Specifically, when the configuration difference calculation unit 25 is notified by the failure predictor detection unit 24 that the predictor of failure has been detected, the configuration difference calculation unit 25 extracts, from the failure predictor pattern DB 17, the entry that corresponds to the detected predictor and then generates, in the failure predictor register DB 18, the entry that corresponds to the failure of which predictor has been detected. At that time, the configuration difference calculation unit 25 receives, from the failure predictor detection unit 24, the configuration information obtained when the predictor is detected and stores it in the "detection configuration" of the entry that is generated in the failure predictor register DB 18. The configuration difference calculation unit 25 then acquires, from the failure predictor pattern DB 17, the configuration information obtained when the detected failure predictor pattern is learned and then calculates the configuration change amount between the system configurations on the basis of the learning-time configuration information and the detection-time configuration information. Afterward, the configuration difference calculation unit 25 stores the calculated configuration change amount in the "configuration change amount" of the entry that is generated in the failure predictor register DB 18.

Figure 11:
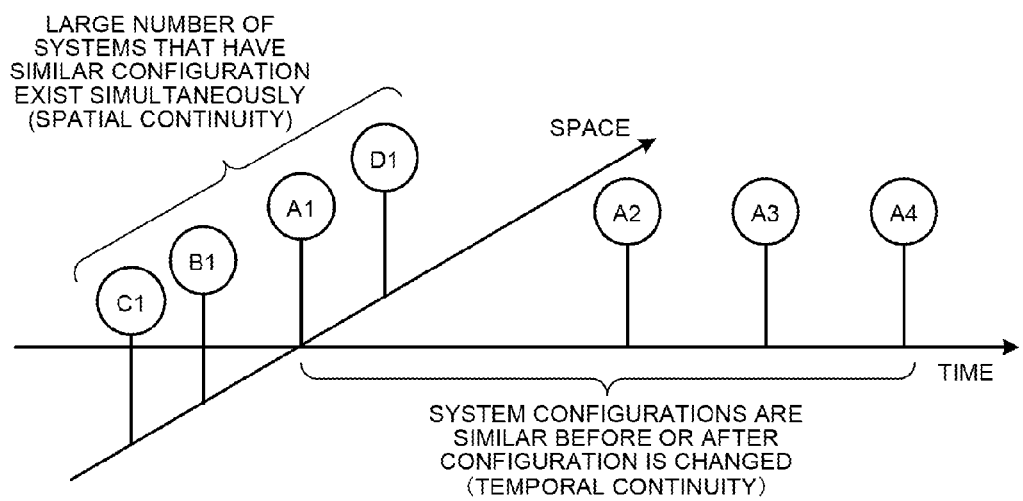
FIG. 11 is a diagram that illustrates changes in the configuration information.

Here, an explanation is given of changes in the configuration information. FIG. 11 is a diagram that illustrates changes in the configuration information. As illustrated in FIG. 11, if the focus is on the system A1, the configuration of the system A1 is partially updated with time. This is called temporal continuity. Furthermore, as multiple systems are generated from the same template in the cloud system, other systems exist about the same time period, which are not completely uniform and are partially different from each other. This is called spatial continuity.

The amount of changes that is calculated with the focus on the temporal continuity is the above-described "number of changes", and the amount of changes that is calculated with the focus on the spatial continuity is the above-described "number of differences". Specifically, the "number of changes" is calculated by using only the number of times a change is made, and it is the value for which considerations are not given to the details of changes, the result of changes, or how the system configuration has been changed. The "number of changes" is the feature amount that does not depend on the system configuration. Furthermore, the "number of differences" is calculated by using only the difference between the system configurations, and considerations are not given to how many times the system configuration has been changed in the past until the system has the current configuration. The "number of differences" is the feature amount that does not depend on the system change history. Thus, the configuration difference calculation unit 25 calculates the configuration change amount between the learning-time configuration information and the detection-time configuration information by using the independent feature amounts that are not relevant to each other.

The predictor notification determination unit 26 is a processing unit that determines whether the detected predictor is valid. Specifically, the predictor notification determination unit 26 determines that the failure predictor pattern to be applied is valid if the configuration change amount calculated by the configuration difference calculation unit 25 is less than the threshold and then notifies the administrator, or the like, of the predictor of the failure that has been detected by using the failure predictor pattern.

For example, in FIG. 9, the predictor notification determination unit 26 acquires, from the failure predictor register DB 18, the configuration change amount "10, 2" with respect to the detected predictor of failure, the predictor of failure having been determined to match the failure predictor pattern "0005, 0007, 0012" in the first line of FIG. 9. If the difference distance specified by the configuration change amount "10, 2" is less than the threshold, the predictor notification determination unit 26 then notifies the administrator, or the like, that there is the possibility of the occurrence of the failure "T001". At this time, if the co-occurrence probability is less than a predetermined value, although the difference distance specified by the configuration change amount "10, 2" is less than the threshold, the predictor notification determination unit 26 may be controlled so as not to send notification to the administrator, or the like.

Figure 12:
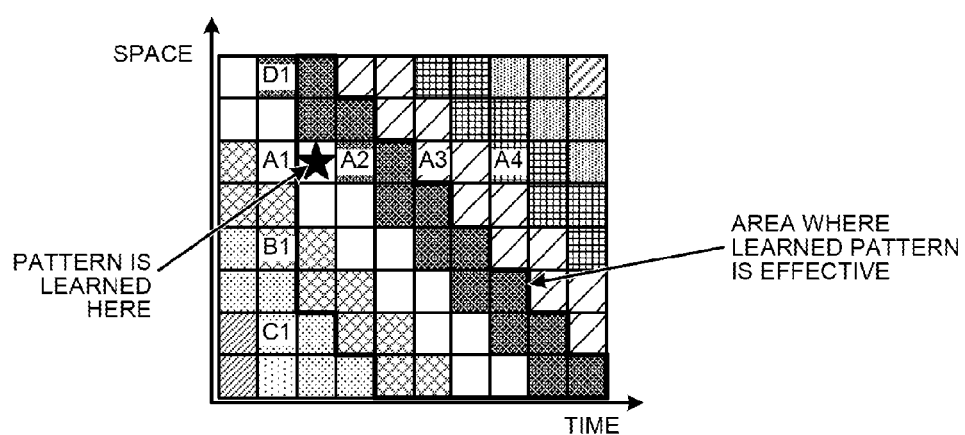
FIG. 12 is a diagram that illustrates the effective area of the failure predictor pattern.

Here, an explanation is given of the effective area of the predictor of failure. FIG. 12 is a diagram that illustrates the effective area of the failure predictor pattern. As illustrated in FIG. 12, after the failure predictor pattern is learned, the configuration of the system is changed along the temporal and spatial axes in the same manner as that in FIG. 11. Specifically, as minor changes, such as a version upgrade to software, are made to the system A with time, the changes are made to the configuration in A1, A2, A3, and A4. In this case, if a failure prediction pattern is learned when the configuration is changed from the system A to A1 so that a change in the configuration is made in a short time, a predictor of failure is detected in each of the systems A1, A2, A3, and A4 by using the failure prediction pattern.

Furthermore, because of the characteristics of the cloud system, the systems B1, C1, and D1 that have a similar configuration to that of the system A exist about the same time period. In this case, a predictor of failure is also detected in each of the systems B1, C1, and D1, which exist about the same time period, by using the failure prediction pattern that is learned when the configuration is changed from the system A to A1.

Thus, the failure predictor pattern that is learned at a certain time is used in the systems that are different in terms of time or space, i.e., the systems that have different configurations. Meanwhile, as failure predictor patterns are generated on the basis of the co-occurrence probability, it is not certain how much effect the changes in the system configuration have on the pattern. Therefore, the predictor notification determination unit 26 uses the configuration change amount calculated by the configuration difference calculation unit 25 to determine the validity of the failure predictor pattern that is to be applied. That is, the predictor notification determination unit 26 quantitatively determines how long the learned failure predictor pattern is to be valid and to which area the learned failure predictor pattern is to be valid. If the predictor notification determination unit 26 determines that it is not valid, the predictor notification determination unit 26 performs a control such that the detected predictor of failure is not to be notified as there is a high possibility of false detection, even though the co-occurrence probability is high.

The threshold learning unit 27 determines whether an actual failure occurs after the predictor of failure has been detected and, in accordance with the result of the determination, sets the threshold of the difference distance by which it is determined whether the failure predictor pattern is applicable. That is, the threshold learning unit 27 statistically determines whether each of the failure predictors detected by using the failure predictor pattern is correct or false detection and updates the threshold that is used by the predictor notification determination unit 26 to determine the validity of the failure predictor pattern.

Specific Example of Validity Determination

Figure 14:
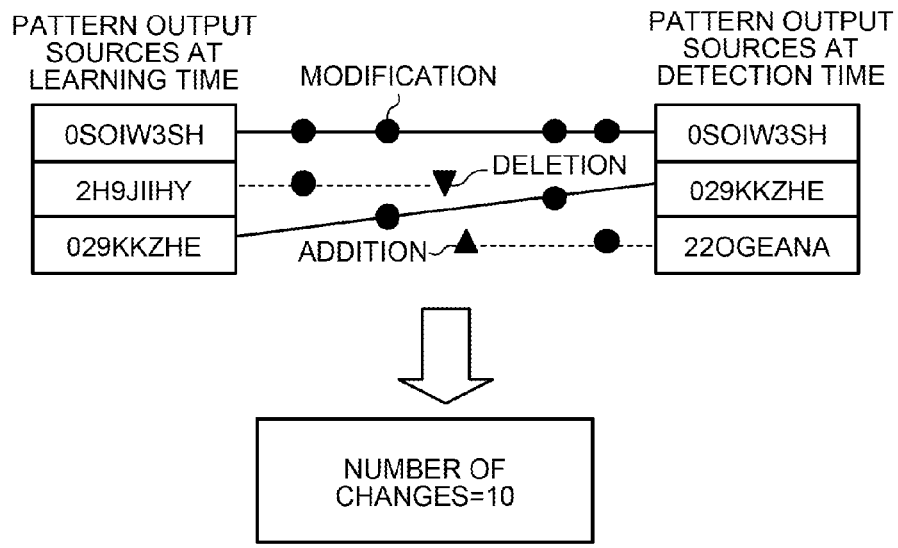
FIG. 14 is a diagram that illustrates the number of times the configuration has been changed.
Figure 15:
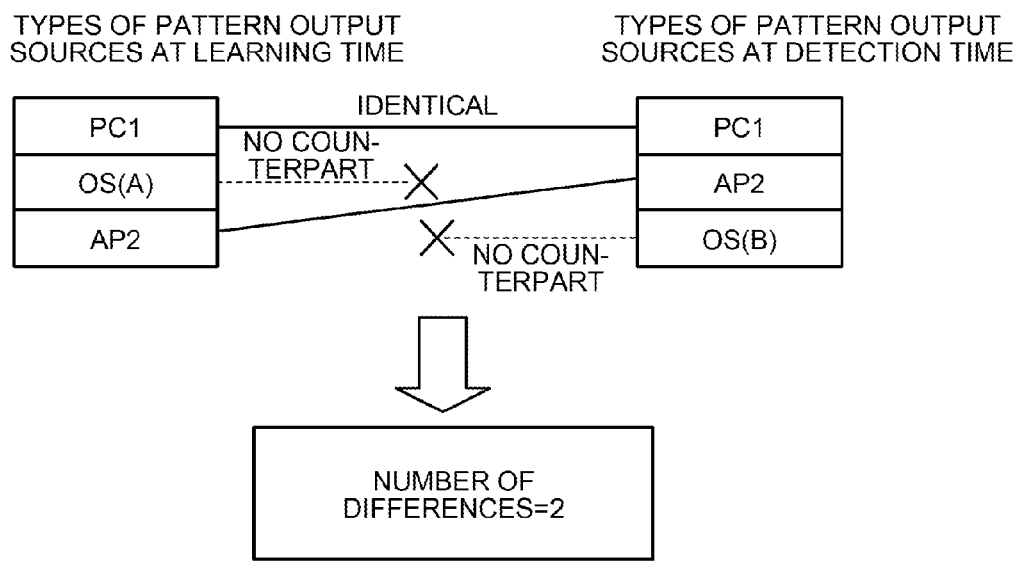
FIG. 15 is a diagram that illustrates the number of differences of the configurations.
Figure 16:
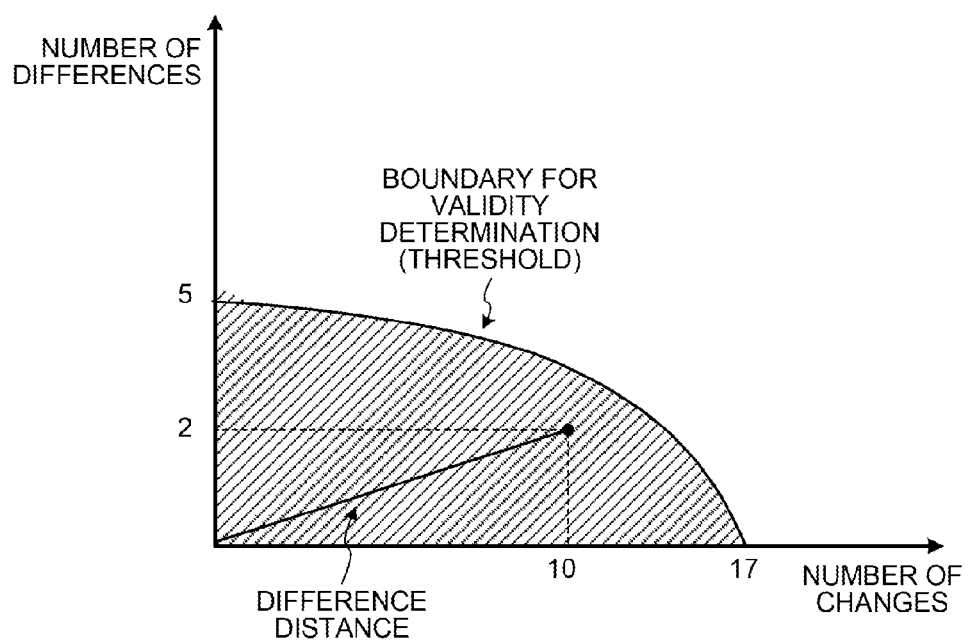
FIG. 16 is a graph that illustrates the criterion for determination.

Next, an explanation is given of, with reference to FIGS. 13 to 16, the specific example of determining the validity of the failure predictor pattern to be applied. FIG. 13 is a diagram that illustrates an example of the configuration information obtained when a predictor of failure is detected. FIG. 14 is a diagram that illustrates the number of times the configuration has been changed. FIG. 15 is a diagram that illustrates the number of differences of the configurations. FIG. 16 is a graph that illustrates the criterion for determination. Here, assume that "0005, 0007, 0012" is detected as the failure prediction pattern and the learning-time configuration is "0SOIW3SH, 2H9JIIHY, 029KKZHE" as illustrated in FIG. 8.

First, the failure predictor detection unit 24 detects, from the log messages stored in the management message DB 15, the occurrence of the message that matches the failure prediction pattern "0005, 0007, 0012". The failure predictor detection unit 24 then extracts the configuration items that output the failure prediction pattern "0005, 0007, 0012". Specifically, the failure predictor detection unit 24 extracts, from the detected message, the time when the failure prediction pattern "0005, 0007, 0012" is detected, the message type ID, and the message sending CI and then generates the configuration information illustrated in FIG. 13. The failure predictor detection unit 24 extracts the "message type ID" from the message type field 15d illustrated in FIG. 6. Furthermore, the failure predictor detection unit 24 identifies the "item" and "type" illustrated in FIG. 3 from the host name field 15b and the module name field 15c illustrated in FIG. 6 and then extracts the corresponding "CI id" as the "message sending CI".

Moreover, the failure predictor detection unit 24 generates, in the failure predictor register DB 18, the entry in which information about the detected predictor of failure is stored. Specifically, the failure predictor detection unit 24 extracts the failure prediction pattern "0005, 0007, 0012", the "failure", and the "co-occurrence probability" from the failure predictor pattern DB 17 and generates, in the failure predictor register DB 18, the record in which the "0005, 0007, 0012", the "failure", and the "co-occurrence probability" become "detection pattern, failure type, and co-occurrence probability", respectively. Furthermore, the failure predictor detection unit 24 stores the time when the predictor is detected in the "time" of the generated entry and stores the "message sending CI" that is identified by the above-described method in the "detection configuration".

Afterward, the configuration difference calculation unit 25 identifies the detection pattern "0005, 0007, 0012" among the entries stored in the failure predictor register DB 18 and extracts, from the failure predictor pattern DB 17, the configuration information "0SOIW3SH, 029KKZHE, 22OGEANA" and "learning time" that correspond to the identified detection pattern. That is, the configuration difference calculation unit 25 extracts the configuration information obtained when the detected message pattern "0005, 0007, 0012" is learned.

Then, the configuration difference calculation unit 25 refers to the configuration change information DB 14 and counts the number of times the configuration has been changed during a time period after the "learning time". That is, the configuration difference calculation unit 25 counts the number of times the configuration has been changed during the time period from the learning time until the detection time.

Specifically, the configuration difference calculation unit 25 refers to the configuration change information DB 14 so as to detect that the settings of the "0SOIW3SH" have been changed four times during the time period from the learning time until the detection time, as illustrated in FIG. 14. The configuration difference calculation unit 25 also detects that the learning-time "2H9JIIHY" has been deleted after its settings were changed once, and it detects that the settings of the learning-time "029KKZHE" have been changed twice before the detection time. The configuration difference calculation unit 25 also detects that the "22OGEANA", which did not exist at the time of learning, has been added after the time of learning and its settings have been changed once. Thus, the configuration difference calculation unit 25 detects that the configuration has been changed ten times during the time period from the learning time until the detection time. That is, the configuration difference calculation unit 25 determines that the number of changes, which is the accumulated number of times changes are made, is ten.

Furthermore, the configuration difference calculation unit 25 refers to the configuration change information DB 14 so as to count the number of differences between the types of learning-time configuration items and the types of detection-time configuration items. That is, the configuration difference calculation unit 25 counts the number of configuration items that are different between the learning time and the detection time.

Specifically, the configuration difference calculation unit 25 refers to the configuration information DB 13 and converts the "CI id" into the "type" with respect to each of the configuration items in the learning-time configuration information "0SOIW3SH, 2H9JIIHY, 029KKZHE". That is, the configuration difference calculation unit 25 converts the "0SOIW3SH" into the "PC1", the "2H9JIIHY" into the "OS (A)", and the "029KKZHE" into the "AP2". Similarly, with respect to each of the configuration items in the detection-time configuration information "0SOIW3SH, 029KKZHE, 22OGEANA", the configuration difference calculation unit 25 converts the "0SOIW3SH" into the "PC1", the "029KKZHE" into the "AP2", and the "22OGEANA" into the "OS(B)". The configuration difference calculation unit 25 then compares the learning-time configuration information "PC1, OS(A), AP2" with the detection-time configuration information "PC1, AP2, OS(B)" and then determines that the number of identical configuration items is "two". That is, the configuration difference calculation unit 25 determines that the number of differences in the different configuration items is two.

Afterward, the configuration difference calculation unit 25 stores, in the "configuration change amount" of the record generated in the failure predictor register DB 18, the number of changes "10", which is the difference in the configuration along the temporal axis and the number of differences "2", which is the difference in the configuration along the spatial axis. The predictor notification determination unit 26 then determines the accuracy of the detected predictor, i.e., determines the validity of the failure predictor pattern in accordance with the configuration change amount "10, 2". Specifically, the predictor notification determination unit 26 plots the configuration change amount "10, 2", where the horizontal axis indicates the number of changes and the vertical axis indicates the number of differences, as illustrated in FIG. 16. At this time, the length of the straight line connecting the point specified by the plotted configuration change amount "10, 2" and the origin (0, 0) is represented as the difference distance. If this difference distance falls within the threshold range, the predictor notification determination unit 26 determines that the detected failure predictor pattern is valid and then reports the predictor. Conversely, if the difference distance does not fall within the threshold range, the predictor notification determination unit 26 determines that the detected failure predictor pattern is not valid and performs a control such that the predictor is not reported.

Specific Example of Learning Threshold

Figure 17:
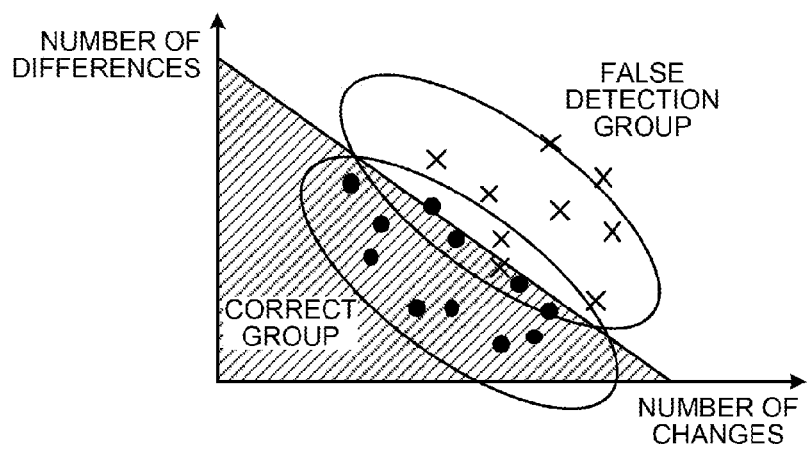
FIG. 17 is a graph that illustrates the learning of a threshold.

Next, an explanation is given of an example of learning the threshold that is used by the predictor notification determination unit 26 to determine the validity of the predictor. FIG. 17 is a graph that illustrates the learning of a threshold. As illustrated in FIG. 17, the threshold learning unit 27 plots the "configuration change amount" of each record stored in the failure predictor register DB 18, where the horizontal axis indicates the number of changes and the vertical axis indicates the number of differences. The threshold learning unit 27 then groups each of the plotted configuration change amounts into the "correct group" and the "false detection group" on the basis of whether the predictor is determined to be valid or invalid. Afterward, the threshold learning unit 27 sets the boundary in the plotted state such that a larger "correct group" is included therein and then determines that the set boundary is a new threshold. The method of setting the boundary may be various statistical methods, such as the Mahalanobis distance.

Process Flow

Next, an explanation is given of the flow of the processes performed by the failure prediction device 10. Here, an explanation is given of the failure predictor learning process, the failure predictor detection process, the predictor notification determination process, the configuration difference calculation process, and the threshold learning process.

Failure Predictor Learning Process

Figure 18:
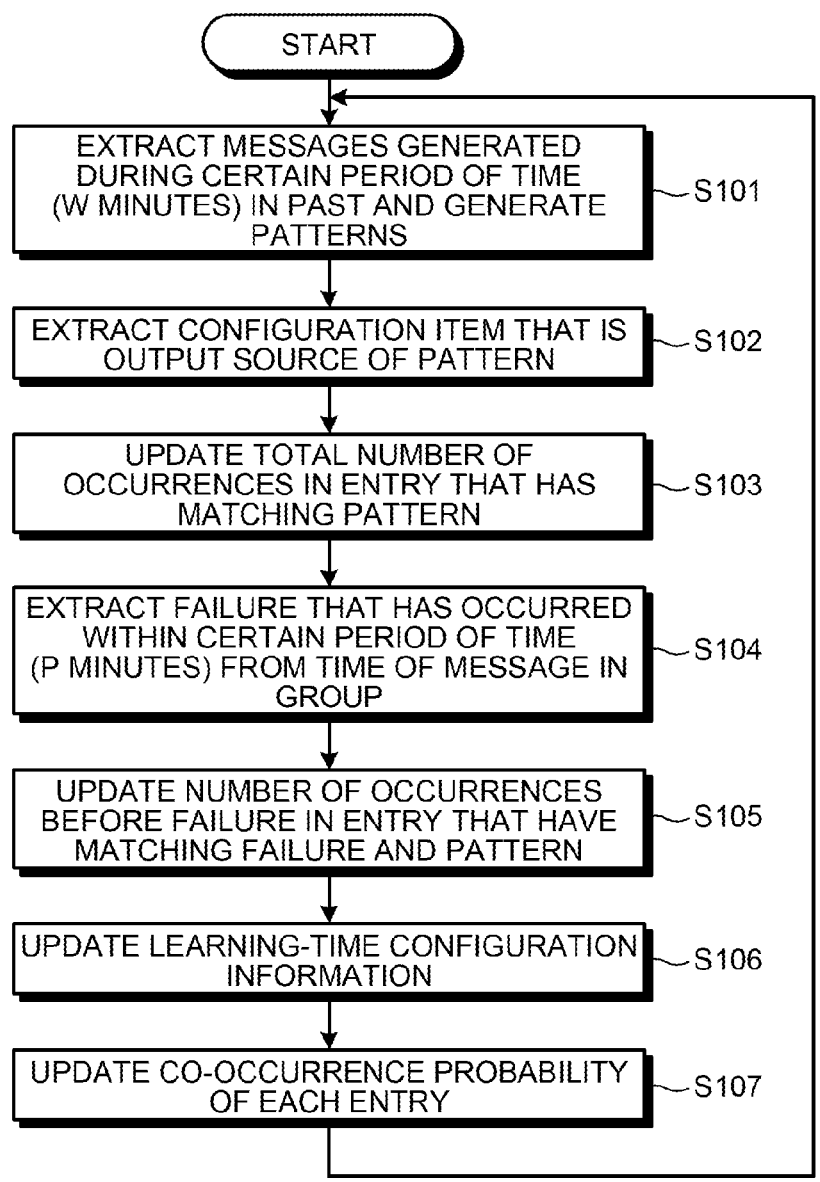
FIG. 18 is a flowchart that illustrates the flow of the failure predictor learning process.

FIG. 18 is a flowchart that illustrates the flow of the failure predictor learning process. This process is performed on a regular basis. As illustrated in FIG. 18, when the learning time is reached, the failure predictor learning unit 23 extracts, from the management message DB 15, messages generated during a certain period of time (W minutes) in the past and generates various patterns (S101).

The failure predictor learning unit 23 then refers to the configuration information DB 13 and the management message DB 15 with respect to each of the generated patterns and extracts the CI (configuration item) that is the source of the message included in each pattern (S102).

With respect to the pattern, among the generated patterns, that matches the failure predictor pattern stored as the failure predictor pattern 17a in the failure predictor pattern DB 17, the failure predictor learning unit 23 updates the "total number of occurrences" of the corresponding failure predictor pattern (S103). Specifically, the failure predictor learning unit 23 increments the "total number of occurrences" in the entry corresponding to the pattern. At this time, the failure predictor learning unit 23 generates, in the failure predictor pattern DB 17, a new entry with respect to the pattern that does not match the failure predictor pattern 17a stored in the failure predictor pattern DB 17.

Afterward, the failure predictor learning unit 23 extracts, from the failure information DB 16, failure that has occurred within a certain period of time (P minutes) after the time of the message in the group that is extracted from the management message DB 15 (S104). If the failure has occurred which matches the "failure" of each entry that is stored in the failure predictor pattern 17a of the failure predictor pattern DB 17, the failure predictor learning unit 23 updates the "number of occurrences before failure" that corresponds to the "failure" in the entry (S105).

Furthermore, the failure predictor learning unit 23 updates the learning-time configuration information 17b that is associated with each entry stored in the failure predictor pattern 17a of the failure predictor pattern DB 17 by using the configuration information that is combined with the configuration items extracted at S102 (S106). Afterward, the failure predictor learning unit 23 re-calculates and updates the co-occurrence probability with respect to each entry of the failure predictor pattern 17a in the failure predictor pattern DB 17 (S107). Afterward, the process returns to S101 and the subsequent process is repeated.

Failure Predictor Detection Process

Figure 19:
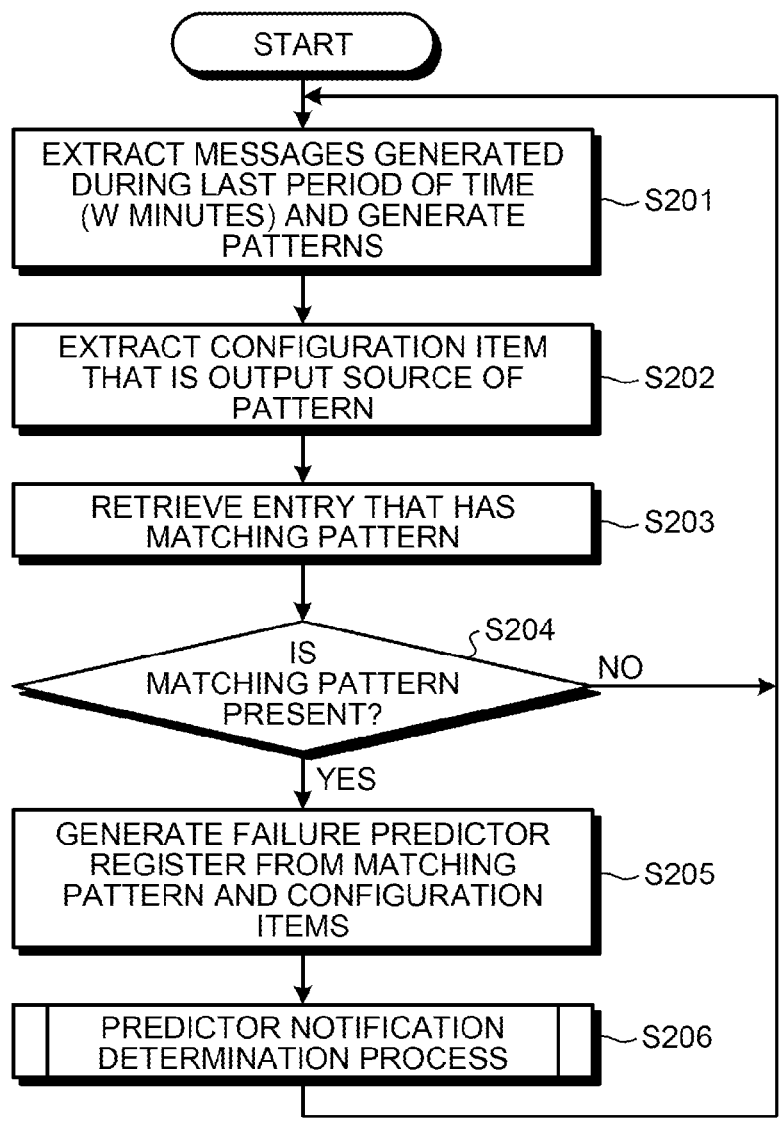
FIG. 19 is a flowchart that illustrates the flow of the failure predictor detection process.

FIG. 19 is a flowchart that illustrates the flow of the failure predictor detection process. This process is performed on a regular basis. As illustrated in FIG. 19, the failure predictor detection unit 24 extracts, from the management message DB 15, messages generated during the last period of time (W minutes) and generates various patterns (S201).

The failure predictor detection unit 24 then refers to the configuration information DB 13 and the management message DB 15 with respect to each of the generated patterns and extracts the CI (configuration item) that is the source of the message included in each pattern (S202).

Among the generated patterns, the failure predictor detection unit 24 retrieves the pattern that matches the failure predictor pattern that is stored as the failure predictor pattern 17a in the failure predictor pattern DB 17 (S203).

If the matching pattern is retrieved (S204: Yes), the failure predictor detection unit 24 uses the matching pattern, the configuration items of the pattern, or the like, to generate an entry in the failure predictor register DB 18 (S205). Afterward, the failure predictor detection unit 24 requests the predictor notification determination unit 26 to perform the predictor notification determination process (S206) and then repeats the steps after S201. If the matching pattern is not retrieved (S204: No), the failure predictor detection unit 24 also repeats the steps after S201.

Predictor Notification Determination Process

Figure 20:
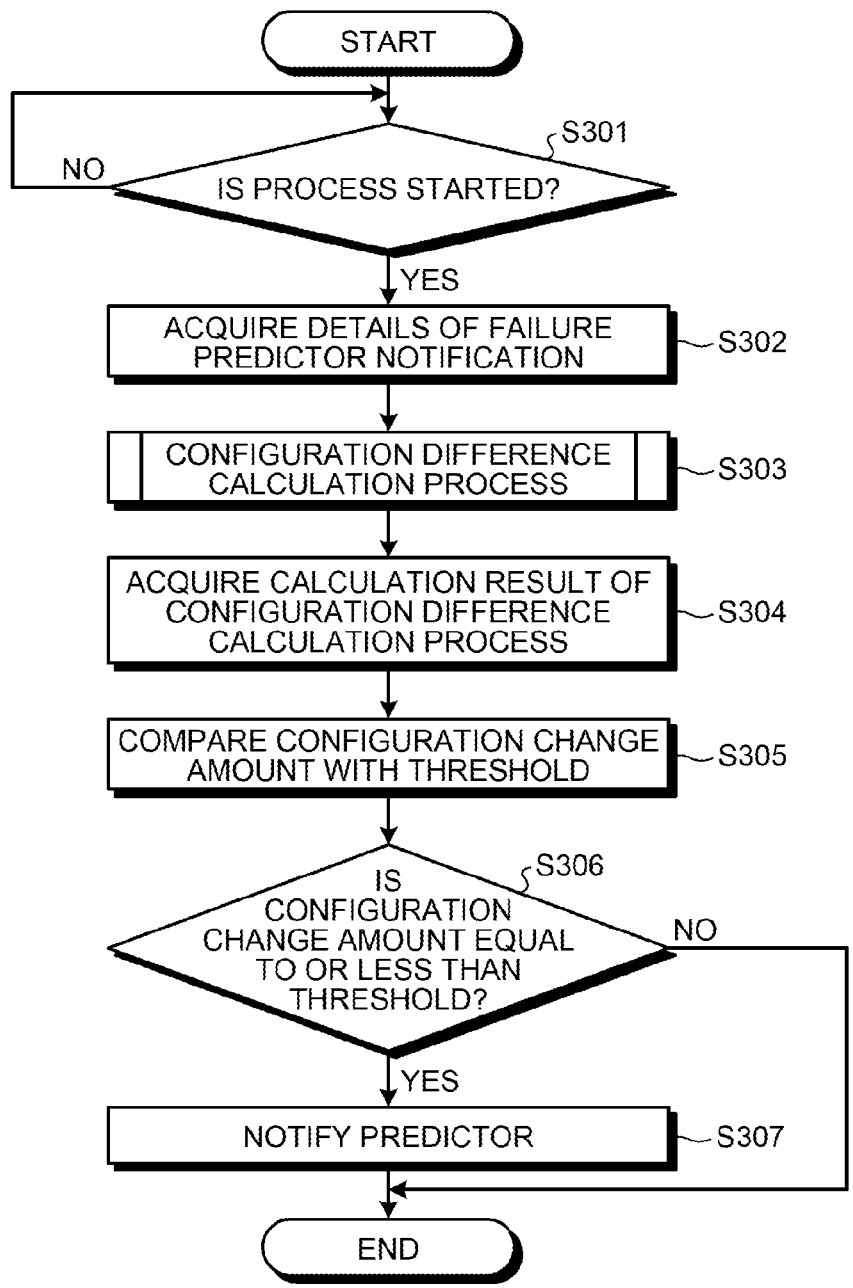
FIG. 20 is a flowchart that illustrates the flow of the predictor notification determination process.

FIG. 20 is a flowchart that illustrates the flow of the predictor notification determination process. As illustrated in FIG. 20, when the failure predictor detection unit 24 requests the predictor notification determination unit 26 to start the process (S301: Yes), the predictor notification determination unit 26 acquires the entry that is stored in the failure predictor register DB 18 by the failure predictor detection unit 24, i.e., the details of the failure predictor notification (S302).

The predictor notification determination unit 26 then requests the configuration difference calculation unit 25 to start the configuration difference calculation process (S303). At that time, the predictor notification determination unit 26 may output the details of the failure predictor notification acquired at S302 to the configuration difference calculation unit 25.

The predictor notification determination unit 26 then acquires the calculation result of the configuration difference calculation process from the configuration difference calculation unit 25 (S304) and compares the configuration change amount, which is the acquired calculation result, with the threshold (S305).

If the predictor notification determination unit 26 determines that the configuration change amount is equal to or less than the threshold (S306: Yes), the predictor notification determination unit 26 notifies the predictor (S307). Conversely, if the predictor notification determination unit 26 determines that the configuration change amount is greater than the threshold (S306: No), the process terminates.

Configuration Difference Calculation Process

Figure 21:
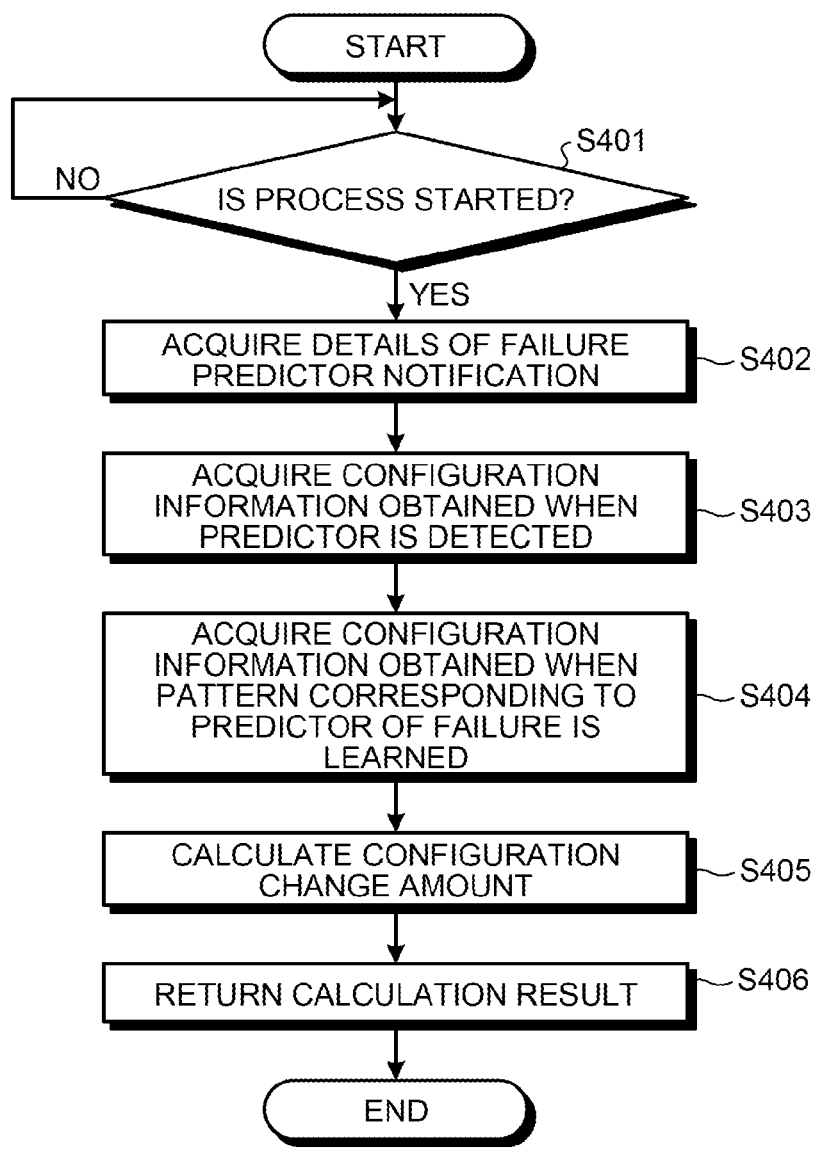
FIG. 21 is a flowchart that illustrates the flow of the configuration difference calculation process.

FIG. 21 is a flowchart that illustrates the flow of the configuration difference calculation process. As illustrated in FIG. 21, when the predictor notification determination unit 26 requests the configuration difference calculation unit 25 to start the process (S401: Yes), the configuration difference calculation unit 25 acquires the entry that is stored in the failure predictor register DB 18 by the failure predictor detection unit 24, i.e., the details of the failure predictor notification (S402).

The configuration difference calculation unit 25 then acquires the configuration information obtained when the predictor is detected from the details of the failure predictor notification acquired at S402 (S403). That is, the configuration difference calculation unit 25 extracts the configuration item that is the output source of each message of the failure predictor pattern.

The configuration difference calculation unit 25 then acquires the configuration information obtained when the pattern corresponding to the predictor of failure is learned (S404). Specifically, the configuration difference calculation unit 25 retrieves the entry corresponding to the detected pattern from the failure predictor pattern DB 17 and identifies the learning-time configuration information that is associated with the retrieved failure predictor pattern. Furthermore, the configuration difference calculation unit 25 acquires the configuration item "message sending CI" that constitutes the identified configuration information.

The configuration difference calculation unit 25 then calculates the configuration change amount (S405) and returns the calculation result to the predictor notification determination unit 26 (S406). Specifically, the configuration difference calculation unit 25 calculates the number of changes, which is the accumulated number of times changes are made to the configuration items within the period from the learning time to the detection time, and calculates the number of differences, which indicates the number of configuration items that are different between the learning time and the detection time. Moreover, the configuration difference calculation unit 25 may store the calculated configuration change amount (the number of changes, the number of differences) in a corresponding entry of the failure predictor register DB 18.

Threshold Learning Process

Figure 22:
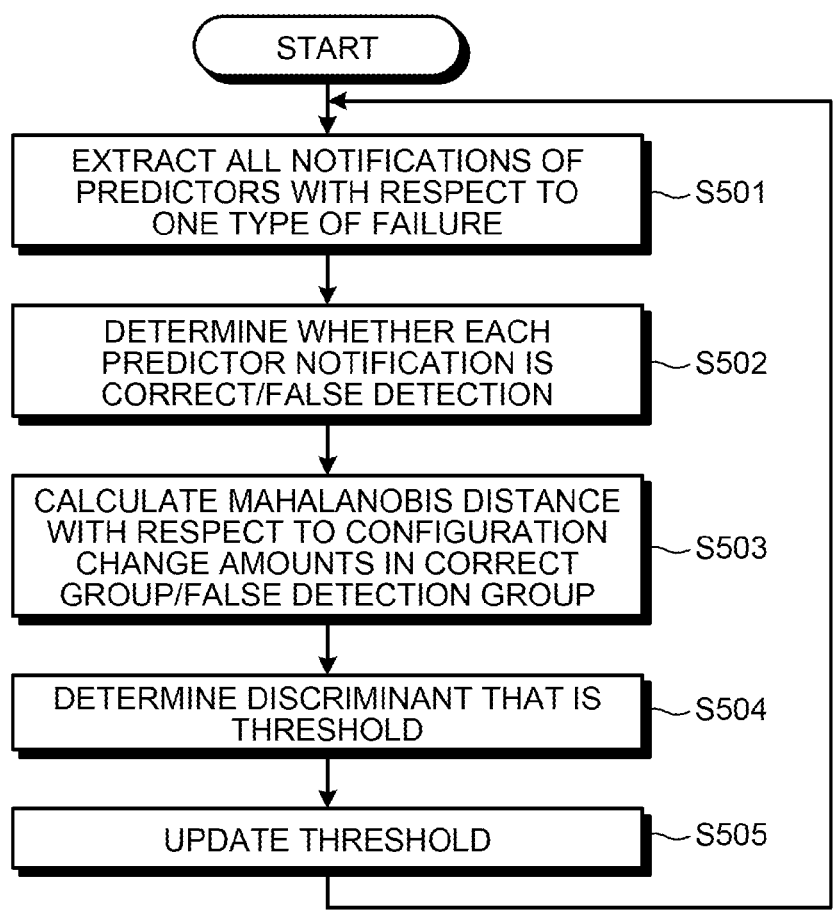
FIG. 22 is a flowchart that illustrates the flow of the threshold learning process.

FIG. 22 is a flowchart that illustrates the flow of the threshold learning process. This process is performed on a regular basis. As illustrated in FIG. 22, when the threshold learning time is reached, the threshold learning unit 27 extracts, from the failure predictor register DB 18, the notifications of predictors with regard to one type of failure (S501). That is, the threshold learning unit 27 acquires, from the failure predictor register DB 18, the entries that have the matching "failure type".

The threshold learning unit 27 then determines whether the predictor is correct or false detection with regard to the extracted predictor notification (S502). Specifically, the threshold learning unit 27 determines whether the "failure" that corresponds to the predictor notification has occurred before a predetermined time period elapses after the extracted predictor notification has been detected.

The threshold learning unit 27 then calculates the Mahalanobis distance with respect to the configuration change amounts in the correct group and the false detection group in accordance with the determination result of each of the predictor notifications (S503). The threshold learning unit 27 then determines the discriminant that is a threshold in accordance with the calculation result of the Mahalanobis distance (S504) and updates the threshold (S505). Afterward, the process returns to S501 and the subsequent process is repeated.

Thus, the failure prediction device 10 according to the first embodiment uses the independent indices to quantify the degree of difference between the configuration obtained at the time of learning and the configuration at the time of detection, thereby determining the validity of the failure prediction pattern to be used. Therefore, the failure prediction device 10 is able to quantitatively determine the amount of changes in the system configuration that makes the learned failure predictor pattern unusable.

Furthermore, when a predictor of failure is actually detected, the failure prediction device 10 is able to determine the validity of the failure predictor pattern that corresponds to the predictor; therefore, the reliability of the detected predictor can be determined. That is, the failure prediction device 10 can prevent notifications to an administrator, or the like, with regard to the low-reliability predictor, i.e., the predictor that is detected by using the failure predictor pattern for which the configuration change amount is greater than the threshold. Thus, the failure prediction device 10 can reduce false detection of predictors that are detected by using inappropriately applied failure predictor patterns.

As the failure prediction device 10 is able to update the criterion for determining the validity of failure predictor patterns on the basis of the detection of predictors and the actual occurrences of failures, the validity can be determined by using the criterion that takes into account the actual occurrences; therefore, and the determination accuracy can be improved.

[b] Second Embodiment

Although an explanation is given, in the first embodiment, of a case where the difference distance between the configuration information at the time of learning and the configuration information at the time of detection is calculated by using the configuration change amount (the number of changes, the number of differences); however, other indices may be used for calculating the difference distance. In a second embodiment, an explanation is given of a case where the amount of load is used as a configuration change amount and a case where the load pattern is used as a configuration change amount.

Amount of Load

Figure 23:
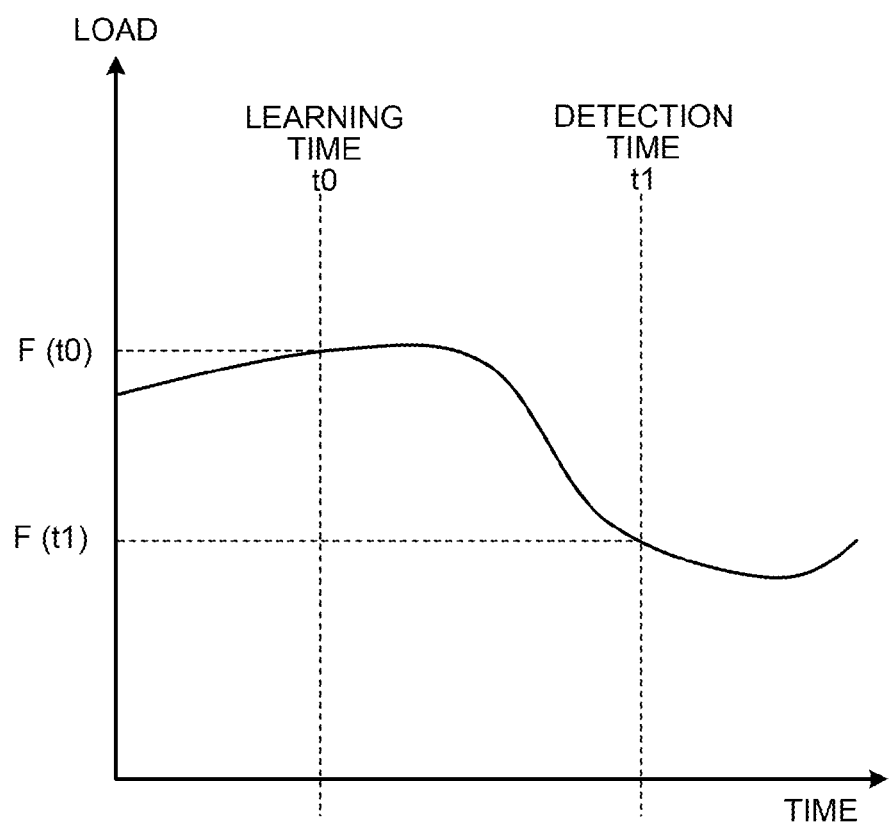
FIG. 23 is a graph that illustrates the amount of load.

FIG. 23 is a graph that illustrates the amount of load. FIG. 23 illustrates an example where the amount of load of an appropriate system changes with time. The vertical axis indicates the load, and the horizontal axis indicates the time. The amount of load illustrated in FIG. 23 is the amount of load applied from outside to the system, such as the number of operations per unit time, the number of concurrent user connections, or the like. The number of operations per unit time corresponds to, for example, the number of pages viewed per day, and the number of concurrent user connections corresponds to the number of users connected at a given time, or the like.

As illustrated in FIG. 23, as the configuration of the system changes with time, the amount of load of the system also changes. Specifically, if the amount of load "F(t0)" at the learning time "t0" is different from the amount of load "F(t1)" at the detection time "t1", there is a high possibility that the system has been changed. Therefore, in this example, the ratio of F(t0) to F(t1) is calculated, and the calculated ratio between the amounts of load is used as the configuration change amount. That is, the configuration difference calculation unit 25 calculates the ratio "D" between the amounts of load by "D=|F(t1)−F(t0)|/F(t0)".

Thus, the failure prediction device 10 is able to use the ratio between the amounts of load as a single configuration change amount or the third configuration change amount that is explained in the first embodiment. As a result, it is possible to objectively use the effect from the outside of the system, which does not directly depend on the internal configuration of the system; therefore, the improvement in the determination accuracy can be expected.

Load Pattern

Figure 24:
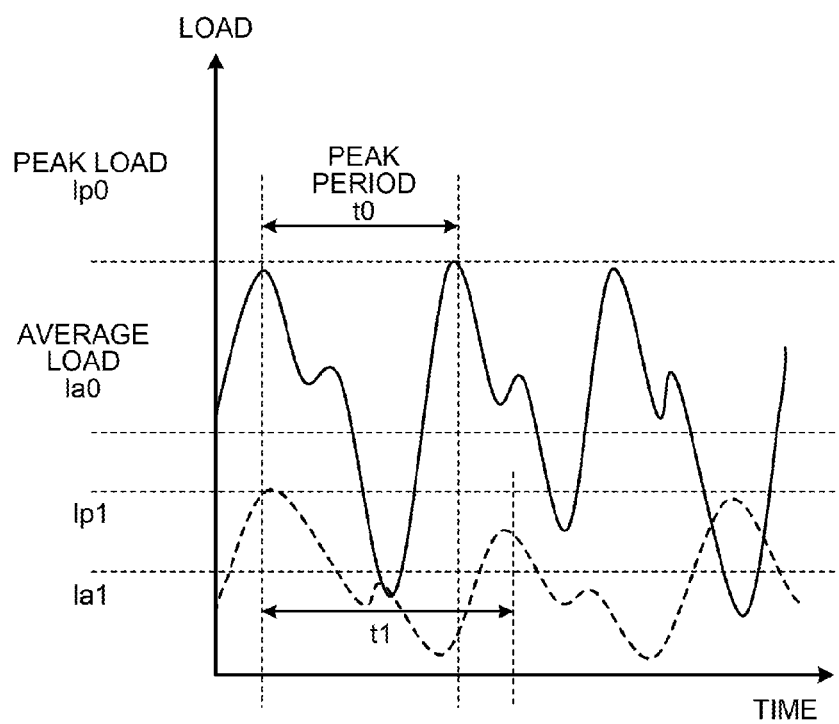
FIG. 24 is a graph that illustrates the load pattern.

FIG. 24 is a graph that illustrates the load pattern. FIG. 24 illustrates the changes in the load that occurs when an appropriate system provides services, or the like, to users. The vertical axis indicates the load, and the horizontal axis indicates the time. Specifically, the load pattern is the operation pattern of the tenant that has the system.

Here, the load pattern L is defined as L(t, lp, la) by using the peak period t of the load, the peak load lp that is the on-peak value of the load, and the average load la. The load pattern at the time of learning can be defined as L0(t0, lp0, la0), and the load pattern at the time of detection can be defined as L1 (t1, lp1, la1).

The difference D between the load pattern of the system at the time of learning and the load pattern of the system at the time of detection can be calculated by "D=(|t1−t0|/t0)+(|lp1−lp0|/lp0)+(|la1−la0|/la0)".

It is considered that, if the tenant at the time of learning is the same as the tenant at the time of detection, their usages and operation load patterns are similar to each other. Therefore, if the difference "D" of the load patterns is near zero, the validity of the learned failure predictor pattern is high. Conversely, it is considered that, if the tenant at the time of learning is different from the tenant at the time of detection, their usages and operation load patterns are different from each other. Therefore, if the difference "D" of the load patterns is a larger value, for example, 30, the validity of the learned failure predictor pattern is low.

Thus, the failure prediction device 10 is able to use the difference of the load patterns as a single configuration change amount or the third configuration change amount that is explained in the first embodiment. As a result, it is possible to objectively use the changes in the state of the system load, which does not directly depend on the internal configuration of the system; therefore, the improvement in the determination accuracy can be expected.

[c] Third Embodiment

Although the embodiments of the present invention have been described above, the present invention may be embodied in various different embodiments other than the above-described embodiments. Other embodiments will be explained below.

Applicable System

In the method for determining the applicability of failure predictor patterns, which is explained in the first and second embodiments, the system at the time of learning may be the same as that at the time of detection or, even if they are different systems, the operations can be performed in the same manner. As described above, the cloud system is often made up of a plurality of systems by using the same template. Therefore, it sometimes happens that a failure predictor pattern is learned by the system A and the failure predictor pattern is applied to the system B. Specifically, the system A and the system B have the same configuration when the failure predictor pattern is learned, and their system configurations are changed with time.

Therefore, the failure prediction device 10 applies the failure predictor pattern, which is learned by the system A, to the system B and manages the changes in the configuration of the system B. If a predictor of failure is detected in the system B, the failure prediction device 10 calculates the number of differences between the system A at the time of learning and the current system B and calculates the number of changes that are made before the learning-time system A is changed to the current system B. Thus, the failure prediction device 10 is able to determine whether the failure predictor pattern is applicable; thus, the same advantage as that in each of the embodiments can be obtained.

Combination of Indices

An explanation is given, in the first embodiment, of a case where the difference distance is calculated by using the number of changes and the number of differences, and an explanation is given, in the second embodiment, of a case where the ratio between the amounts of load and the ratio between the load patterns are used; however, they may be optionally combined. For example, in a case where the number of changes and the ratio between the load patterns are used, the configuration change amount is plotted by using the number of changes in the horizontal axis and the ratio between the load patterns in the vertical axis, and a determination may be made as to whether the difference distance is equal to or less than the threshold. Furthermore, a determination may be made as to whether the difference distance is equal to or less than the threshold by using the number of changes, the number of differences, the ratio between the amounts of load, and the load pattern in four dimensions. If the ratio between the amounts of load or the load patterns are used, it is determined in advance that they are to be used, and the ratio between the amounts of load or the load patterns are measured at the time of learning.

Co-Occurrence Probability

The failure predictor pattern DB 17 described in the first embodiment, and the like, may store therein patterns whose co-occurrence probability is equal to or greater than a predetermined value. In such a condition, when the failure prediction device 10 detects a predictor of failure, the failure prediction device 10 determines the validity of the failure predictor pattern. As a result, the failure prediction device 10 detects a predictor of failure by using the failure predictor pattern whose co-occurrence probability is high and, if the failure predictor pattern is not valid, the failure prediction device 10 can prevent the notification of the predictor as the low-reliability predictor is detected.

The failure predictor pattern DB 17 may store therein patterns whose co-occurrence probability is low. In such a condition, when the failure prediction device 10 detects a predictor of failure, the failure prediction device 10 determines the validity of the failure predictor pattern. As a result, depending on the difference between the system configuration at the time of learning and the system configuration at the time of detection, the failure prediction device 10 detects a predictor of failure by using the low-reliability failure predictor pattern that has a low co-occurrence probability but, in some cases, determines that the failure predictor pattern is valid. In this case, the failure prediction device 10 can send the notification of the predictor as the high-reliability predictor has been detected.

System

Among the processes described in the embodiments, all or some of the processes that are automatically performed as described above can be performed manually. Furthermore, all or some of the processes that are manually performed as described above can be performed automatically by using a well-known method. Furthermore, the operation procedures, the control procedures, the specific names, and the information including various types of data and parameters as described in the above specifications and the drawings can be arbitrarily changed except as otherwise noted.

The components of each device illustrated are functionally conceptual, and the components are not always physically configured as illustrated in the drawings. Specifically, specific forms of separation and combination of each device are not limited to those depicted in the drawings. A configuration may be such that all or some of the device are functionally or physically separated or combined in an arbitrary unit depending on various types of loads or usage. Furthermore, all or any of the various processing functions performed by each device may be implemented by a CPU and the program analyzed and executed by the CPU or may be implemented as hardware by wired logic.

Hardware

Figure 25:
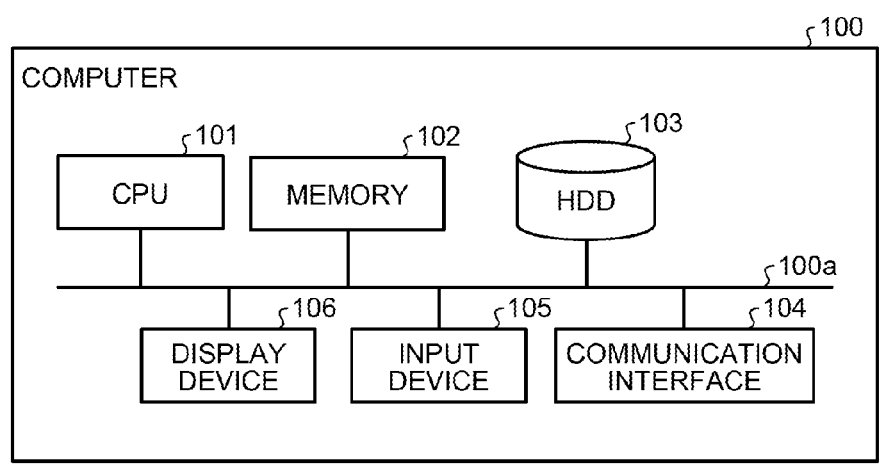
FIG. 25 is a diagram that illustrates an example of the hardware configuration.

FIG. 25 is a diagram that illustrates an example of the hardware configuration. The hardware configuration illustrated here is the hardware configuration of the failure prediction device 10. As illustrated in FIG. 25, a computer 100 includes a CPU 101, a memory 102, a hard disk drive (HDD) 103, a communication interface 104, an input device 105, and a display device 106. Moreover, the units illustrated in FIG. 25 are connected to one another via a bus 100a.

The input device 105 is, for example, a keyboard or the like, the display device 106 is, for example, a display or the like, and the communication interface 104 is, for example, a network interface card (NIC) or the like. The HDD 103 stores therein the program that executes the function illustrated in FIG. 2 and the like, and stores therein each of the DBs illustrated in FIG. 2. The HDD 103 is given as an example of a recording medium; however, various types of programs may be stored in a recording medium, such as a read only memory (ROM), RAM, or CD-ROM, that is readable by another computer, and the programs may be read by the computer. Furthermore, a recording medium may be installed in a remote location, and the computer may access the recording medium so as to acquire and use the program. At that time, the acquired program may be stored in a recording medium of the computer and be used.

The CPU 101 reads, from the HDD 103 or the like, the program that performs the same operation as that of each of the processing units illustrated in FIG. 2 and loads the program to the memory 102 so that the process is performed to execute each of the functions illustrated in FIG. 2 and the like. Specifically, this process executes the same function as that of each of the processes included in the failure prediction device 10. That is, the CPU 101 reads, from the HDD 103 or the like, the program that has the same function as that of the configuration change learning unit 21, the message collecting unit 22, the failure predictor learning unit 23, the failure predictor detection unit 24, the configuration difference calculation unit 25, the predictor notification determination unit 26, and the threshold learning unit 27. The CPU 101 performs the process to execute the same operation as that of each processing unit. Thus, the computer 100 reads and executes the program so as to operate as the information processing apparatus that performs the applicability determination method.

Furthermore, the computer 100 reads the above-described program from the recording medium by using a medium read device and executes the read program so as to perform the same functionality as that in the above-described embodiment. The program described in this embodiment is not limited to that executed by the computer 100. For example, the present invention may be also applied to a case where a different computer or server executes the program or they cooperate with each other so as to execute the program.

According to the embodiment of the present invention, it is possible to determine the validity of a failure predictor pattern to be used for detecting a predictor of failure.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein an applicability determination program that causes a computer to execute a process comprising:

generating a failure predictor pattern in accordance with previous cases of failure that has occurred in a first system configuration, the failure predictor pattern being used to detect a predictor of failure in the first system configuration;

when a system configuration is changed from the first system configuration to a second system configuration, calculating a number of changes that is an accumulated number of times that a change of the configuration item which is included in a system is executed, the number of changes being calculated with the focus on temporal continuity of the system configuration and indicating a feature amount that does not depend on the system configuration;

calculating a number of differences that is a number of different configuration items between configuration items included in the first system configuration and configuration items included in the second system configuration, the number of differences being calculated with the focus on spatial continuity and indicating a feature amount that does not depend on a change history of the system;

detecting a predictor of failure by using the generated failure predictor Pattern in the second system;

first determining, when the predictor of failure is detected, whether or not the number of changes is less than a first threshold and whether or not the number of different configuration items is less than a second threshold; and second determining that the generated failure predictor is valid when the number of changes is less than the first threshold and the number of different configuration items is less than the second threshold and notifying the predictor of the failure to a predetermined destination.

2. The non-transitory computer-readable recording medium according to claim 1, wherein
the calculating includes further calculating a load amount ratio that is a ratio of an amount of load of the system at a time of the first system configuration to an amount of load of the system at a time of the second system configuration,
the first determining includes further determining whether or not the load amount ratio is less than a third threshold, and
the notifying includes notifying the predictor of the failure when the load amount ratio is less than the third threshold.

3. The non-transitory computer-readable recording medium according to claim 1, wherein
the calculating includes further calculating a load pattern difference that is a difference between a load pattern that indicates a tendency of load of the system at a time of the first system configuration and a load pattern that indicates a tendency of load of the system at a time of the second system configuration,
the first determining includes further determining whether or not the load pattern difference is less than a third threshold, and
the notifying includes notifying the predictor of the failure when the load pattern difference is less than the third threshold.

4. The non-transitory computer-readable recording medium according to claim 1, wherein
the calculating includes calculating a load amount ratio that is a ratio of an amount of load of the system at a time of the first system configuration to an amount of load of the system at a time of the second system configuration, or a load pattern difference that is a difference between a load pattern that indicates a tendency of load of the system at a time of the first system configuration and a load pattern that indicates a tendency of load of the system at a time of the second system configuration,
the first determining includes further determining whether or not the load amount ratio is less than a third threshold or whether or not the load pattern difference is less than a third threshold, and
the notifying includes notifying the predictor of the failure when the load amount ratio is less than the third threshold or when the load pattern difference is less than the third threshold.

5. The non-transitory computer-readable recording medium according to claim 1, wherein the process further comprises:
detecting a predictor of failure by using the failure predictor pattern;
determining whether an actual failure occurs after the predictor of failure is detected; and
in accordance with a result of determination, determining the first threshold and the second threshold.

6. An applicability determination method performed by a computer, the method comprising:
generating a failure predictor pattern in accordance with previous cases of failure that has occurred in a first system configuration, the failure predictor pattern being used to detect a predictor of failure in the first system configuration;
when a system configuration is changed from the first system configuration to a second system configuration, calculating a number of changes that is an accumulated number of times that a change of the configuration item which is included in a system is executed, the number of changes being calculated with the focus on temporal continuity of the system configuration and indicating a feature amount that does not depend on the system configuration;
calculating a number of differences that is a number of different configuration items between configuration items included in the first system configuration and configuration items included in the second system configuration, the number of differences being calculated with the focus on spatial continuity and indicating a feature amount that does not depend on a change history of the system;
detecting a predictor of failure by using the generated failure predictor pattern in the second system;
first determining, when the predictor of failure is detected, whether or not the number of changes is less than a first threshold and whether or not the number of different configuration items is less than a second threshold; and
second determining that the generated failure predictor is valid when the number of changes is less than the first threshold and the number of different configuration items is less than the second threshold and notifying the predictor of the failure to a predetermined destination.

7. A failure prediction device, comprising:
a processor configured to execute a process including:
generating a failure predictor pattern in accordance with previous cases of failure that has occurred in a first system configuration, the failure predictor pattern being used to detect a predictor of failure in the first system configuration;
when a system configuration is changed from the first system configuration to a second system configuration, calculating a number of changes that is an accumulated number of times that a change of the configuration item which is included in a system is executed, the number of changes being calculated with the focus on temporal continuity of the system configuration and indicating a feature amount that does not depend on the system configuration;
calculating a number of differences that is a number of different configuration items between configuration items included in the first system configuration and configuration items included in the second system configuration, the number of differences being calculated with the focus on spatial continuity and indicating a feature amount that does not depend on a change history of the system;
detecting a predictor of failure by using the generated failure predictor pattern in the second system;
first determining, when the predictor of failure is detected, whether or not the number of changes is less than a first threshold and whether or not the number of different configuration items is less than a second threshold; and
second determining that the generated failure predictor is valid when the number of changes is less than the first threshold and the number of different configuration items is less than the second threshold and notifying the predictor of the failure to a predetermined destination.

* * * * *